US012618206B2

(12) United States Patent
Hendricks, Sr.

(10) Patent No.: US 12,618,206 B2
(45) Date of Patent: *May 5, 2026

(54) ROBOTIC MAINTENANCE VEHICLE AND MODULES

(71) Applicant: PIONEER INDUSTRIAL SYSTEMS, LLC, Alvordton, OH (US)

(72) Inventor: Todd Hendricks, Sr., Monclova, OH (US)

(73) Assignee: RMV LEASING LLC, Alvordton, OH (US)

( * ) Notice: Subject to any disclaimer, the term of this patent is extended or adjusted under 35 U.S.C. 154(b) by 407 days.

This patent is subject to a terminal disclaimer.

(21) Appl. No.: 17/865,603

(22) Filed: Jul. 15, 2022

(65) Prior Publication Data

US 2022/0349132 A1     Nov. 3, 2022

Related U.S. Application Data

(63) Continuation-in-part of application No. 17/189,841, filed on Mar. 2, 2021, now Pat. No. 11,795,637.
(Continued)

(51) Int. Cl.
| | |
|---|---|
| B25J 9/16 | (2006.01) |
| E01C 23/09 | (2006.01) |
| E01F 9/70 | (2016.01) |

(52) U.S. Cl.
CPC ............ *E01C 23/096* (2013.01); *B25J 9/162* (2013.01); *B25J 9/1653* (2013.01); *B25J 9/1679* (2013.01); *B25J 9/1697* (2013.01); *E01F 9/70* (2016.02)

(58) Field of Classification Search
None
See application file for complete search history.

(56) References Cited

U.S. PATENT DOCUMENTS

| | | | |
|---|---|---|---|
| 5,263,790 A | 11/1993 | Bickley et al. | |
| 5,651,657 A * | 7/1997 | Poindexter | ............ B60P 1/4442 |
| | | | 254/3 R |

(Continued)

FOREIGN PATENT DOCUMENTS

| | | |
|---|---|---|
| CA | 2914265 A1 | 12/2014 |
| CA | 2963236 A1 | 12/2014 |

(Continued)

OTHER PUBLICATIONS

Written Opinion of the International Searching Authority dated Jun. 24, 2022.

(Continued)

*Primary Examiner* — Jason Lin
(74) *Attorney, Agent, or Firm* — Jacob M. Ward; Ward Law Office LLC

(57) ABSTRACT

The robotic maintenance vehicle (RMV) has a propulsion system, a control system, an electrical power source, a maintenance module, a multi-axis robot, an optical system, and a location translator. The maintenance module is configured to hold different kinds of road maintenance materials. The multi-axis robot is configured to convey the road maintenance material from either the maintenance module to the road, the road to the maintenance module, or both. The optical system and the location translator are configured to be controlled by the control system and operate in conjunction to instruct the multi-axis robot where to pick up and/or place the road maintenance material. The multi-axis robot is configured to be selectively coupled to a distal arm tool.

21 Claims, 16 Drawing Sheets

Related U.S. Application Data

(60) Provisional application No. 62/985,018, filed on Mar. 4, 2020.

(56) References Cited

U.S. PATENT DOCUMENTS

| | | | |
|---|---|---|---|
| 7,232,285 B1 * | 6/2007 | Ruch | B66F 9/10 |
| | | | 254/10 R |
| 7,513,731 B2 * | 4/2009 | Studer | B60P 1/4421 |
| | | | 414/491 |
| 7,581,917 B1 * | 9/2009 | Depagter | B60P 3/40 |
| | | | 296/3 |
| 8,075,239 B2 * | 12/2011 | Hanzel | B60R 7/08 |
| | | | 296/26.1 |
| 8,613,583 B1 | 12/2013 | Watkins | |
| 9,211,831 B2 * | 12/2015 | Frazier | B60P 1/4492 |
| 9,347,185 B2 | 5/2016 | Reda | |
| 9,566,986 B1 | 2/2017 | Gordon et al. | |
| 9,724,877 B2 | 8/2017 | Flitsch et al. | |
| 9,972,205 B2 | 5/2018 | Beaulieu | |
| 9,987,792 B2 | 6/2018 | Flitsch et al. | |
| 10,124,359 B2 * | 11/2018 | Raman | B05B 13/005 |
| 10,201,932 B2 | 2/2019 | Flitsch et al. | |
| 10,525,631 B2 | 1/2020 | Flitsch et al. | |
| 10,661,505 B2 | 5/2020 | Flitsch et al. | |
| 10,836,107 B2 | 11/2020 | Flitsch et al. | |
| 10,898,396 B2 * | 1/2021 | Celis | A61G 3/062 |
| 11,194,306 B2 | 12/2021 | Flitsch et al. | |
| 11,214,202 B2 * | 1/2022 | Carbone | B60R 9/042 |
| 11,358,169 B2 * | 6/2022 | Micucci, Jr. | B05B 13/005 |
| 2006/0291957 A1 * | 12/2006 | Lidster | E01F 9/70 |
| | | | 404/73 |
| 2007/0037484 A1 * | 2/2007 | Ohishi | B08B 7/02 |
| | | | 451/6 |
| 2009/0097914 A1 * | 4/2009 | Flynn | E01F 9/70 |
| | | | 404/9 |
| 2011/0270445 A1 * | 11/2011 | Nichols | G01N 35/025 |
| | | | 700/258 |
| 2016/0032540 A1 | 2/2016 | Reda | |
| 2016/0318187 A1 * | 11/2016 | Tan | B25J 5/007 |
| 2016/0333537 A1 * | 11/2016 | Julien | E01F 9/70 |

| | | | |
|---|---|---|---|
| 2017/0023266 A9 | 1/2017 | Baruch | |
| 2017/0079201 A1 * | 3/2017 | Jägenstedt et al. | B60L 53/16 |
| 2017/0154524 A1 | 6/2017 | Beaulieu | |
| 2018/0342153 A1 | 11/2018 | Ellis et al. | |
| 2019/0322319 A1 | 10/2019 | Smith et al. | |
| 2019/0374967 A1 | 12/2019 | Micucci, Jr. | |
| 2020/0050206 A1 | 2/2020 | Deyle et al. | |
| 2020/0131725 A1 * | 4/2020 | Hung | G06V 20/588 |
| 2020/0331547 A1 | 10/2020 | Kowalchuk | |
| 2021/0060785 A1 | 3/2021 | Vandersmitte et al. | |
| 2021/0229591 A1 | 7/2021 | Dannar et al. | |
| 2021/0273454 A1 | 9/2021 | Dannar et al. | |
| 2021/0311489 A1 | 10/2021 | Tiwari et al. | |
| 2022/0026913 A1 | 1/2022 | Narang et al. | |
| 2024/0218615 A1 | 7/2024 | Van Putten et al. | |

FOREIGN PATENT DOCUMENTS

| | | | | |
|---|---|---|---|---|
| CN | 105339551 A | 2/2016 | | |
| EP | 3014022 A1 | 5/2016 | | |
| GB | 2496416 A * | 5/2013 | | B60R 19/38 |
| JP | 6510509 B2 | 5/2019 | | |
| KR | 20120004619 A | 1/2012 | | |
| KR | 101218494 B1 | 1/2013 | | |
| WO | 2013068716 A1 | 5/2013 | | |
| WO | WO-2016006283 A1 * | 1/2016 | | G06Q 50/08 |
| WO | 2020/263816 A1 | 12/2020 | | |

OTHER PUBLICATIONS https://vimeo.com/588534095?embedded=true&source=vimeo_logo&owner=4527648.

https://vimeo.com/573778242?embedded=true&source=vimeo_logo&owner=4527648.

https://www.youtube.com/watch?v=3zvXMCCu5oE.

https://www.youtube.com/watch?v=C_mcF0evW54.

https://vimeo.com/490867777?embedded=true&source=vimeo_logo&owner-4527648.

https://vimeo.com/496730676?embedded=true&source=vimeo_logo&owner=4527648.

https://www.youtube.com/watch?v=-t9TqiPosKM.

* cited by examiner

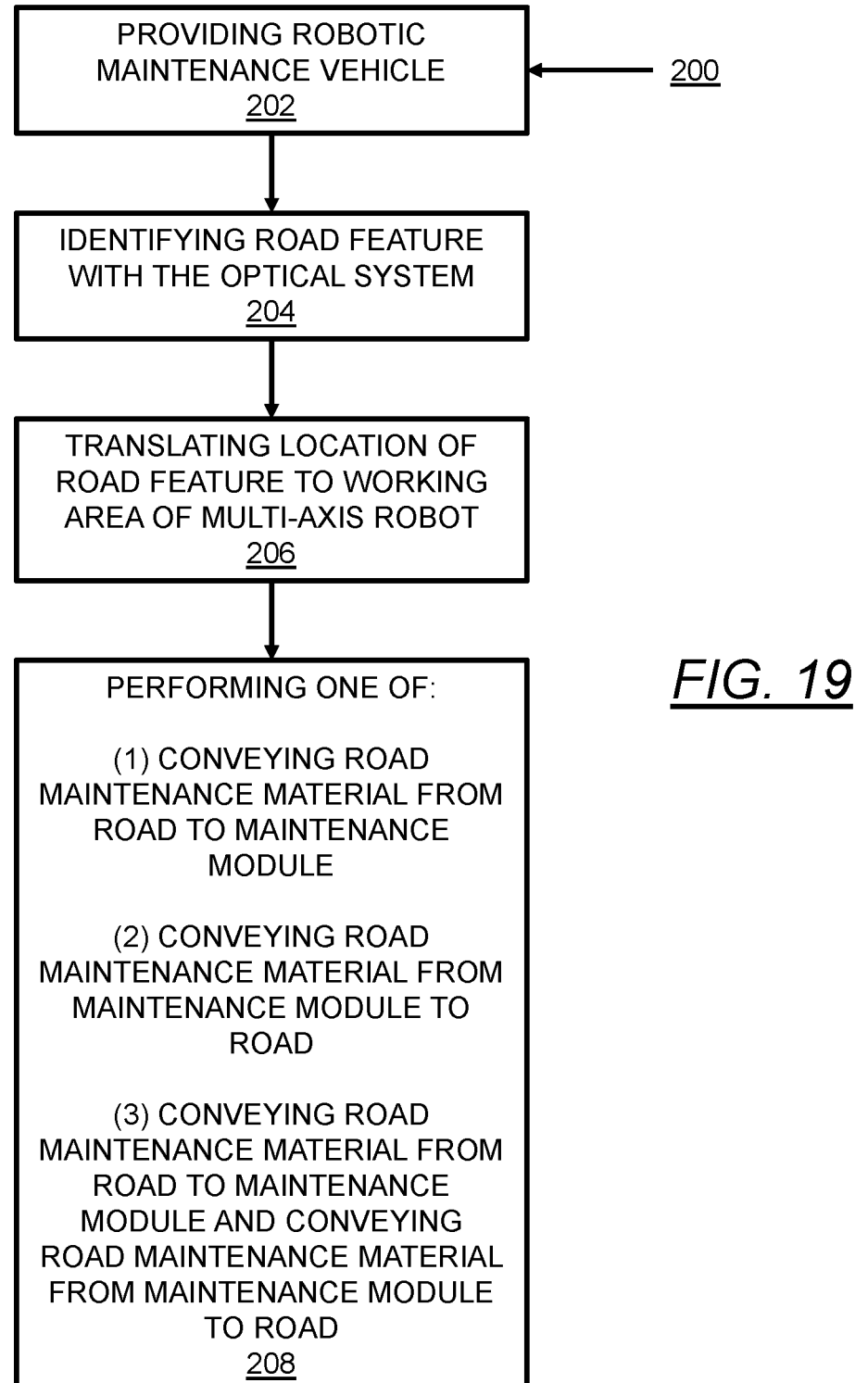

PROVIDING ROBOTIC
MAINTENANCE VEHICLE
202

← 200

IDENTIFYING ROAD FEATURE
WITH THE OPTICAL SYSTEM
204

TRANSLATING LOCATION OF
ROAD FEATURE TO WORKING
AREA OF MULTI-AXIS ROBOT
206

PERFORMING ONE OF:

(1) CONVEYING ROAD
MAINTENANCE MATERIAL FROM
ROAD TO MAINTENANCE
MODULE (2) CONVEYING ROAD
MAINTENANCE MATERIAL FROM
MAINTENANCE MODULE TO
ROAD (3) CONVEYING ROAD
MAINTENANCE MATERIAL FROM
ROAD TO MAINTENANCE
MODULE AND CONVEYING
ROAD MAINTENANCE MATERIAL
FROM MAINTENANCE MODULE
TO ROAD
208

*FIG. 19*

ROBOTIC MAINTENANCE VEHICLE AND MODULES

CROSS-REFERENCE TO RELATED APPLICATIONS

This application is a continuation-in-part of U.S. patent application Ser. No. 17/189,841, filed on Mar. 2, 2021, which claims the benefit of U.S. Provisional Application. No. 62/985,018 filed on Mar. 4, 2020. The entire disclosure of the above application is incorporated herein by reference.

FIELD

The present disclosure relates to road maintenance technology, more particularly, robotic systems for use in construction or maintenance of roads.

INTRODUCTION

This section provides background information related to the present disclosure which is not necessarily prior art.

There are several problems facing today's highway and road maintenance teams. These include, but are not limited to, the following examples. There are safety issues, where workers can be exposed to high-speed traffic, distracted drivers, hazardous materials and equipment, and poor climate conditions. Ergonomic issues exist as maintenance work can involve several miles of walking and heavy lifting of material and equipment. Undesirably, this can lead to muscle strain, muscle imbalances, and fatigue. Efficiency issues exist relating to time spent training employees, preparing for zone control, setting up work zones, taking down work zones, and breaks. This wasted time reduces the overall time available for efficient work. Labor requirements place certain demands on projects, where road maintenance can take multiple people to set up, maintain zones, patrol zones, do the actual work, act as spotters, maintain safety, and maintain equipment. In addition, it can be difficult to find and keep good workers due to the hard-manual labor required and the rise of unemployment or shortage thereof. Traffic issues relate to where traffic can be hindered due to the length of the work zones and the amount of time needed to complete the maintenance. Undesirably, this can damage local economies. Equipment limitations can be present where road maintenance projects require multiple trucks and dedicated equipment to perform a single task, such as sealing cracks, setting cones, painting lines or arrows, etc. This equipment can be cost prohibitive, especially for smaller contractors. Material usage considerations include where different operators may apply too little or too much material for a given task. This can result in suboptimal coverage resulting in waste. Quality issues can occur, as most road maintenance generally involves manual labor and judgment based decisions, hence the quality of the end product can be inconsistent due to the skill of the individual worker. Environmental issues can be present, as with multiple vehicles, chemicals, and fuels being used in road maintenance, there is always the risk of an environmental accident. In addition, construction or maintenance vehicles and equipment emit carbon and heat into the atmosphere. Finally, other labor issues can impact road maintenance, including worker no-shows, vacations, scheduled breaks, allowing an operator to set a work pace, the high cost of benefits, as well as insurance and workers compensation claims.

There is a continuing need for a robotic maintenance vehicle and modules that improve the quality of road maintenance. Desirably, functions of the robotic maintenance vehicle and modules can be automated to optimize road maintenance tasks, thereby improving worker safety and efficiency while more consistently tending transportation and community infrastructure.

SUMMARY

In concordance with the instant disclosure, a robotic maintenance vehicle and modules that improve the quality of road construction and/or maintenance, and which functions of the robotic maintenance vehicle and modules can be automated to militate against human error, has been surprisingly discovered.

In certain embodiments, a robotic maintenance vehicle (RMV) includes a vehicle platform, a control system, an electrical power source, a multi-axis robot, an optical system, and a location translator. The RMV may further include a maintenance module. The vehicle platform may include a propulsion system configured to propel the vehicle platform. The control system may be configured to control the vehicle, the maintenance module, the electrical power source, the multi-axis robot, the optical system, the location translator, or a combination thereof. The maintenance module may be configured to hold a road maintenance material. Non-limiting examples of the road maintenance material may include traffic cones, road sealant (e.g., tar), and paint. The multi-axis robot and/or control system may be powered by the electrical power source. The multi-axis robot may be configured to convey the road maintenance material from either the maintenance module to the road, the road to the maintenance module, or both. The multi-axis robot may also be configured to be selectively coupled to a distal arm tool. Non-limiting examples of the distal arm tool may include a sealant dispenser, a cone picker, a saw, a grinder, a painter sprayer, and a scanner. The optical system may be configured to identify a road feature. Non-limiting examples of the road feature may include a traffic cone, a crack, a pothole, a painted signal, and a reflective pavement marker. The location translator may be configured to translate a location of the road feature identified by the optical system to a working area of the multi-axis robot.

In certain embodiments, the RMV may include another multi-axis robot powered by the electrical power source. The another multi-axis robot may be configured to convey the road maintenance material from either the maintenance module to the road, the road to the maintenance module, or both. The optical system may be configured to identify another road feature sequentially or simultaneously. The location translator may be configured to translate a location of the another road feature identified by the optical system to a working area of the another multi-axis robot.

In certain embodiments, the present technology includes various ways of using the RMV. Examples include various methods where an RMV is provided that includes a vehicle, a control system, an electrical power source, a maintenance module, a multi-axis robot, an optical system, and a location translator. Such methods may include performing a road maintenance operation. Examples of the road maintenance operation may include one of (1) conveying the road maintenance material from the road to the maintenance module, (2) conveying the road maintenance material from the maintenance module to the road, and (3) conveying the road maintenance material from the road to the maintenance module and conveying the road maintenance material from the maintenance module to the road.

In certain embodiments, the present technology can provide a base unit truck or trailer with a robot, a controller, an electrical power source, an optical system, and a location translator that can accept various modules to greatly improve the way highway construction or maintenance is currently done. Non-limiting examples of these modules can include a crack sealer, pothole filler, painter, cone setter and/or cone picker, post setter, sign setter, vacuum cleaner, core sampler, grinder, saw, reflector inserter, inspection and marking systems. By creating a universal robotic maintenance vehicle (RMV) base unit with swappable modules, the present technology can greatly reduce the problems faced by today's road construction or maintenance workforce. Solutions to the problems listed above are outlined below:

1) SAFETY: The RMV only requires a small crew. In addition, the robot of the RMV will be doing the manual labor. Therefore, workers can be removed from dangerous traffic areas, which can improve safety and reduce risks.

2) ERGONOMICS: Since the RMV will be doing the manual labor, workers will be less likely to be exposed to poor ergonomics. Desirably, this can reduce physically strenuous situations and insurance claims.

3) EFFICIENCY: The RMV may be configured to perform certain tasks and repeat them on a regular basis. Desirably, this can result in materials being applied consistently and accurately. This may also reduce the amount of training required for workers.

4) LABOR INTENSIVE and SHORTAGE: The RMV can greatly reduce the human labor required for a given maintenance project. For example, the RMV with the cone setter module could quickly set up a zone with no workers exposed to traffic followed by a second RMV moving down the highway using the optical system to find and measure cracks, the location translator to align the visual data with the robot, and the robot dispensing sealant to fill cracks. The tandem RMVs with two drivers can do a job that typically takes several trucks with workers walking along while one worker is controlling the dispense hose and nozzle. Desirably, this can greatly reduce labor and free up workers to fill in for other positions, instead of hiring and training new employees.

5) TRAFFIC FLOW: Again, with the example above of the RMV with Cone Setter and

Sealant Modules working in tandem, a much shorter work zone may be created. The lead RMV could set the cones and seal the cracks in the road from one vehicle while a second chase RMV keeps traffic shifted over and automatically picks up the cones as it follows a desired distance behind the lead RMV. Thus, creating a moving working zone and possibly reducing the required working distance. This much shorter moving work zone may greatly reduce traffic flow and backups.

6) EQUIPMENT REQUIREMENTS: An RMV with modules may greatly reduce the number of specialty or dedicated vehicles and equipment required to perform specific tasks. Again, by keeping the operator in the RMV and using a robot for labor, the overall pieces of equipment and trucks required for a project may be minimized.

7) MATERIAL USAGE: Using automated controls and a robot controlling precisely where and how much material is being used for a specific application may greatly reduce the amount of material used, such as sealer, filler, or paint.

8) QUALITY: Just as with material usage, the automated controls and the robot controlling precisely where and how much material is used for a specific application may greatly improve the quality of the process, such as sealing, filling, or painting.

9) ENVIRONMENTAL: By reducing the number of vehicles and controlling the processes automatically, amounts of materials, chemicals, and fuels used may be much less. The use of automated controls may also reduce the risk of an environmental spills. The use of the RMV and modules in road maintenance may require fewer vehicles emitting carbon and heat into the atmosphere, therefore the impact on climate change may greatly be reduced.

10) OTHER LABOR PROBLEMS: With a robot performing the manual labor, human errors may be reduced as well as challenges of maintaining workers not showing up for work, scheduling vacations, taking breaks, the rising cost of benefits, production rates variance, worker comp and insurance claims.

As can be seen with the advancement of automation and robotics, the RMV provided by the present technology, where modules can be swapped in and out, will help to eliminate or reduce the problems listed above. The various RMV embodiments disclosed herein can provide optimized performance for infrastructure, construction, or maintenance and corresponding monetary savings to states, counties, cities, towns, and townships.

Further areas of applicability will become apparent from the description provided herein. It should be understood that the description and specific examples are intended for purposes of illustration only and are not intended to limit the scope of the present disclosure.

DRAWINGS

The above, as well as other advantages of the present disclosure, will become readily apparent to those skilled in the art from the following detailed description, particularly when considered in the light of the drawings described herein.

5

6

Figures 10, 11:
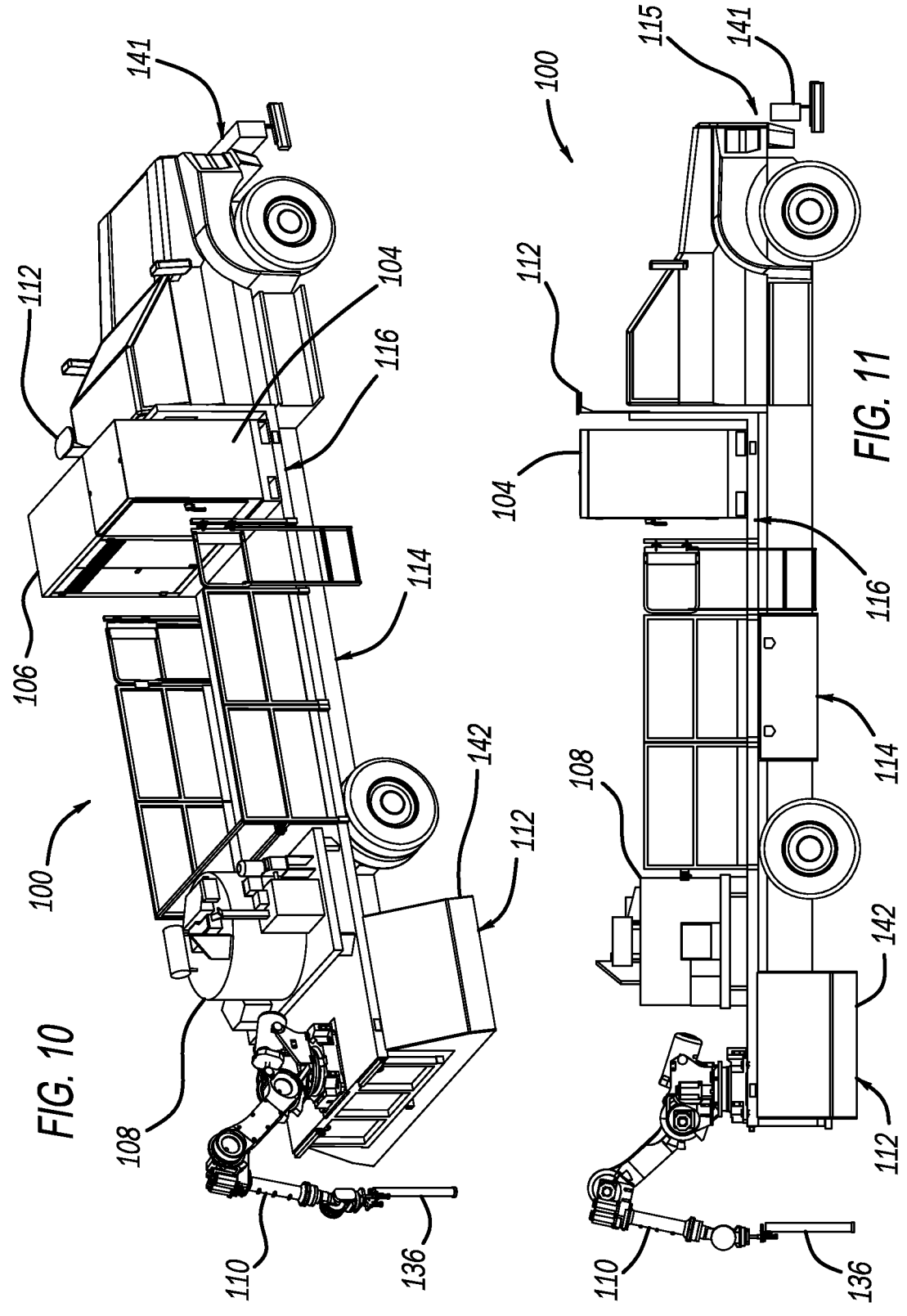
FIG. 10 is a rear perspective view of a third embodiment of the RMV, depicted with a sealant module and an optical mapping module.
Figures 12, 13:
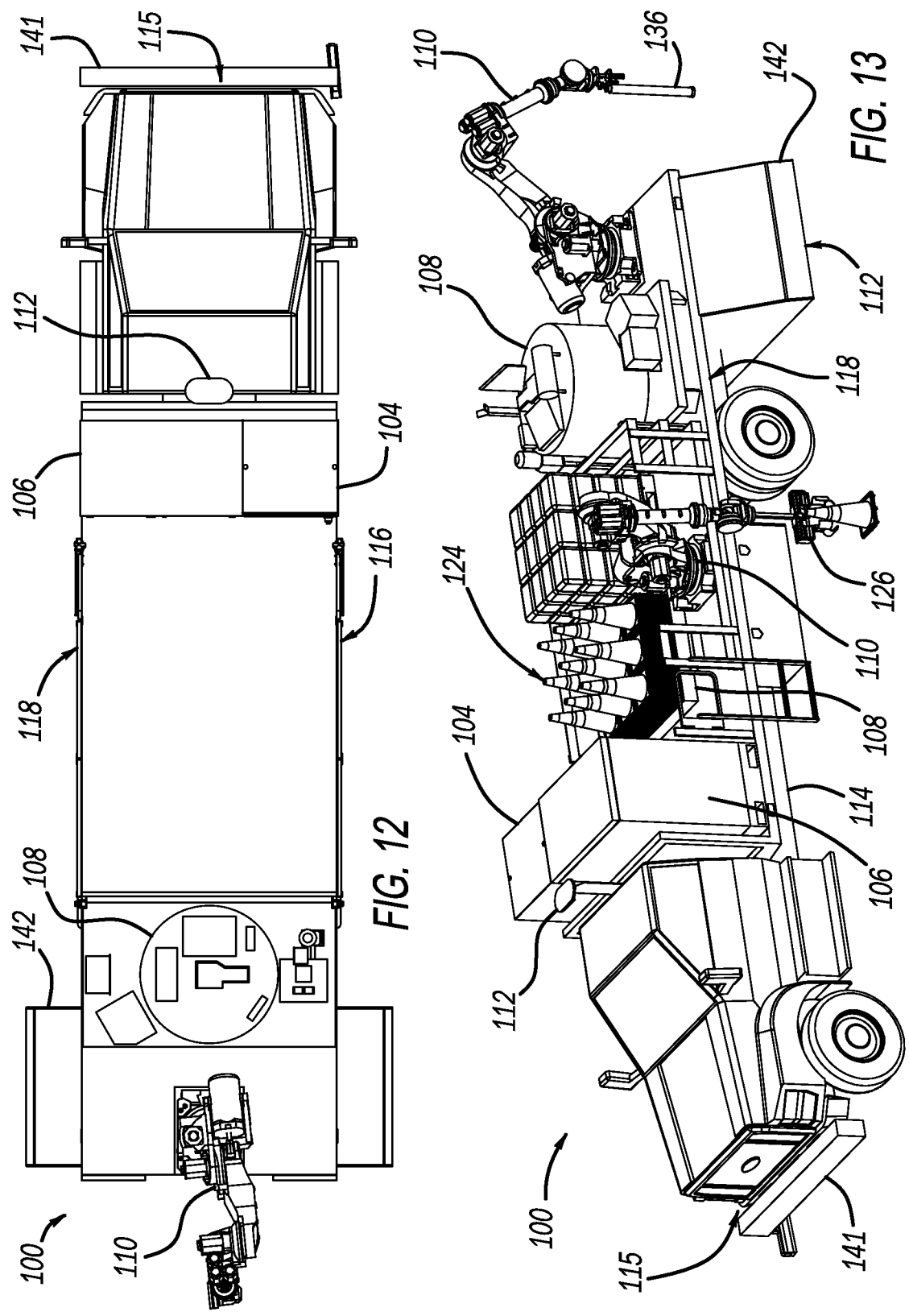
Figures 14, 15:
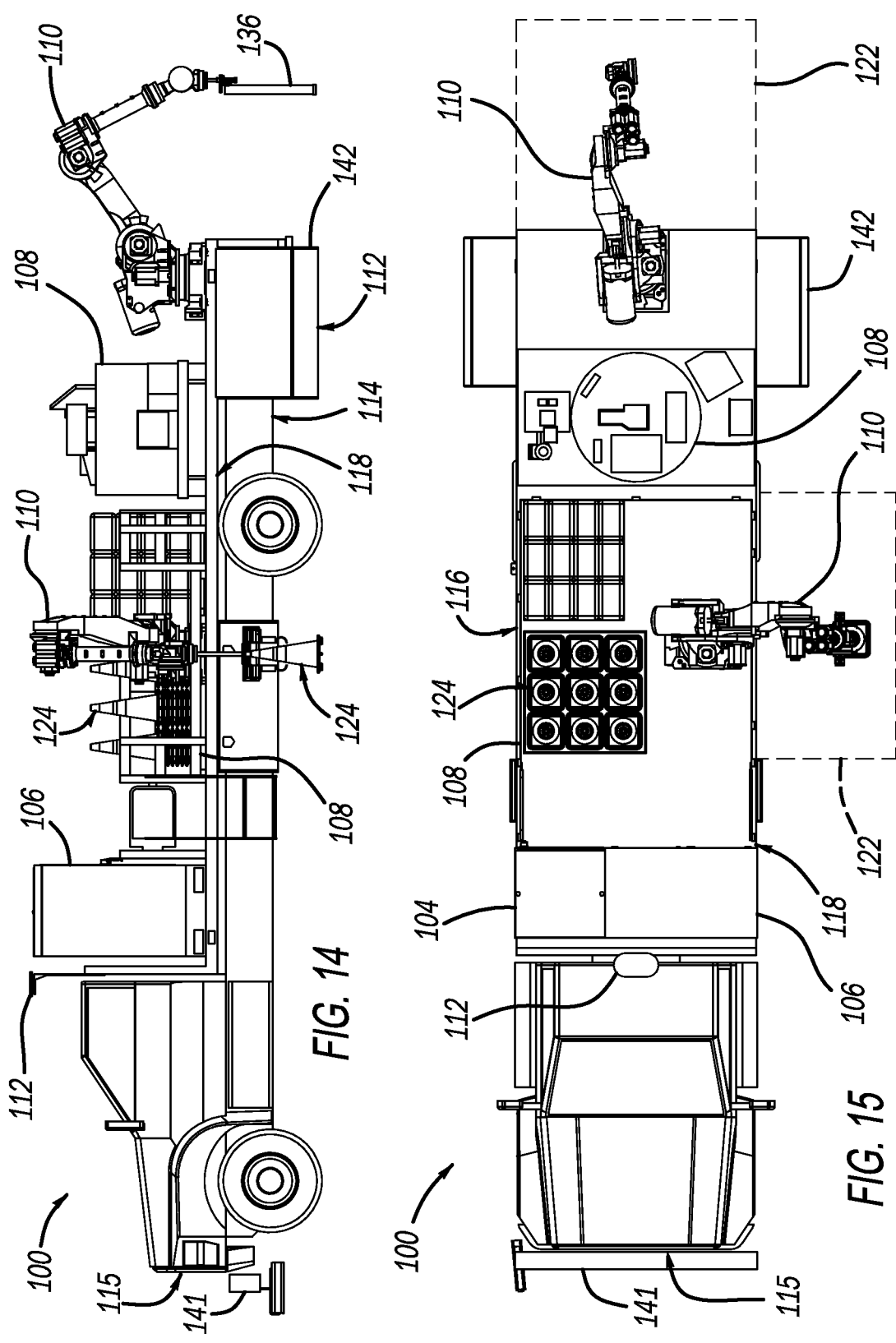
Figures 16, 17:
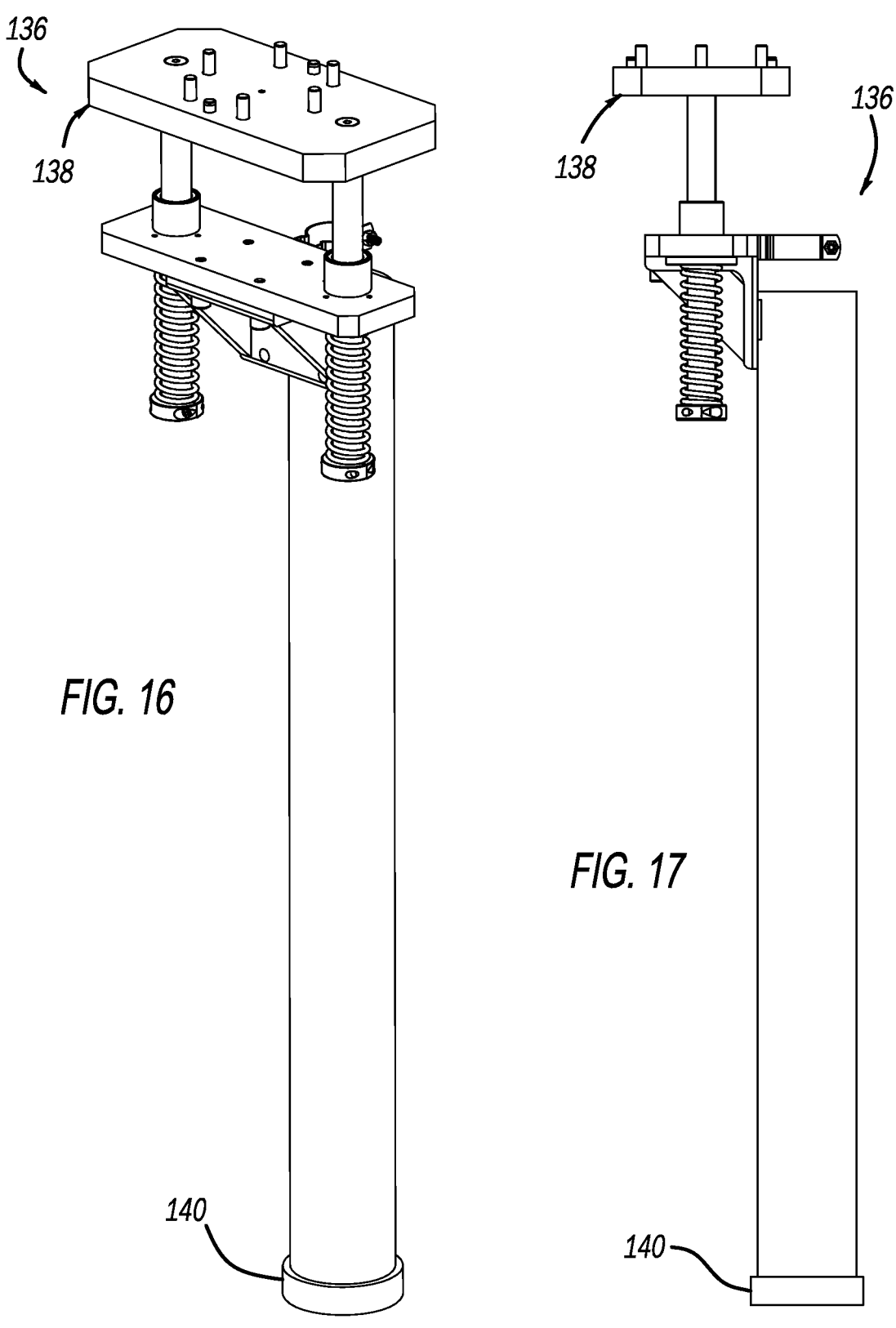
Figure 18:
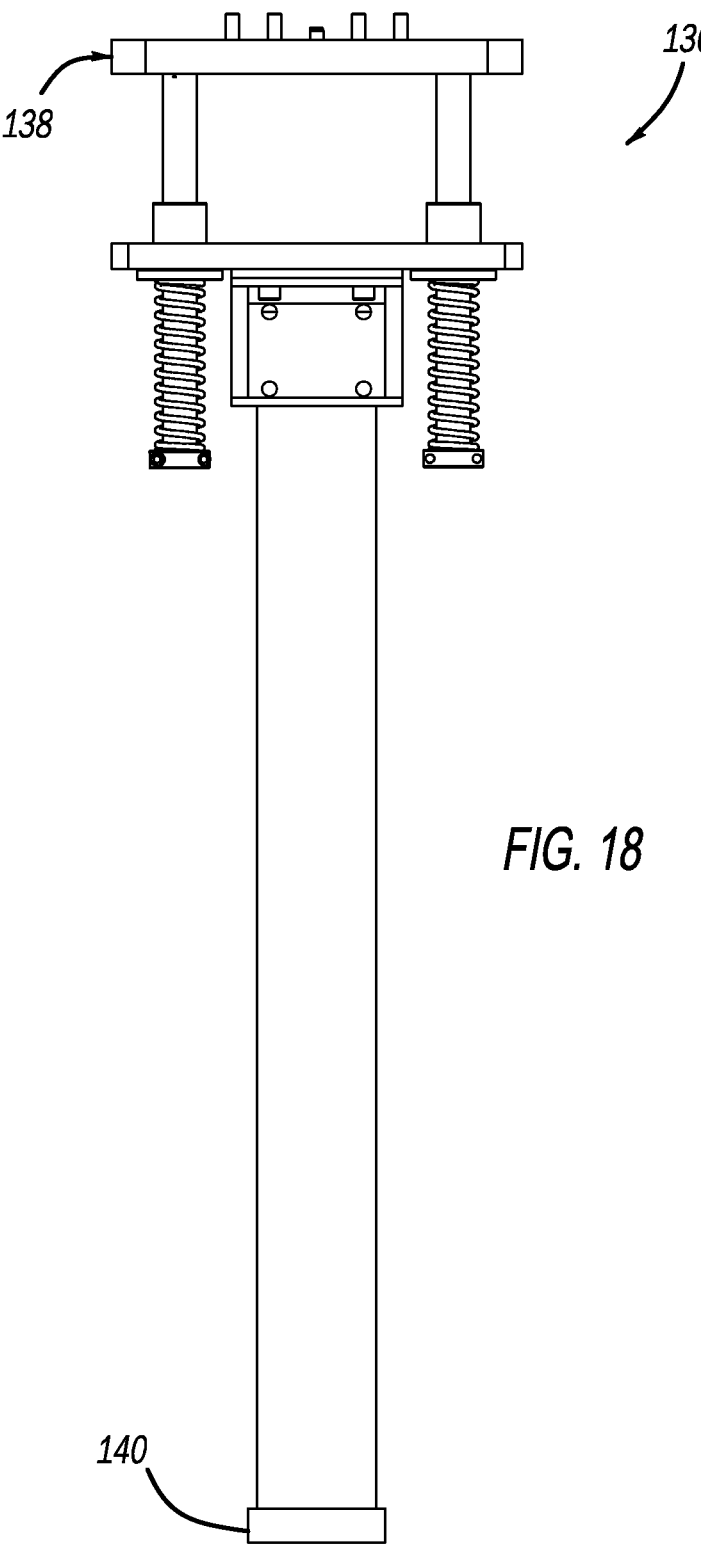
Figure 20:
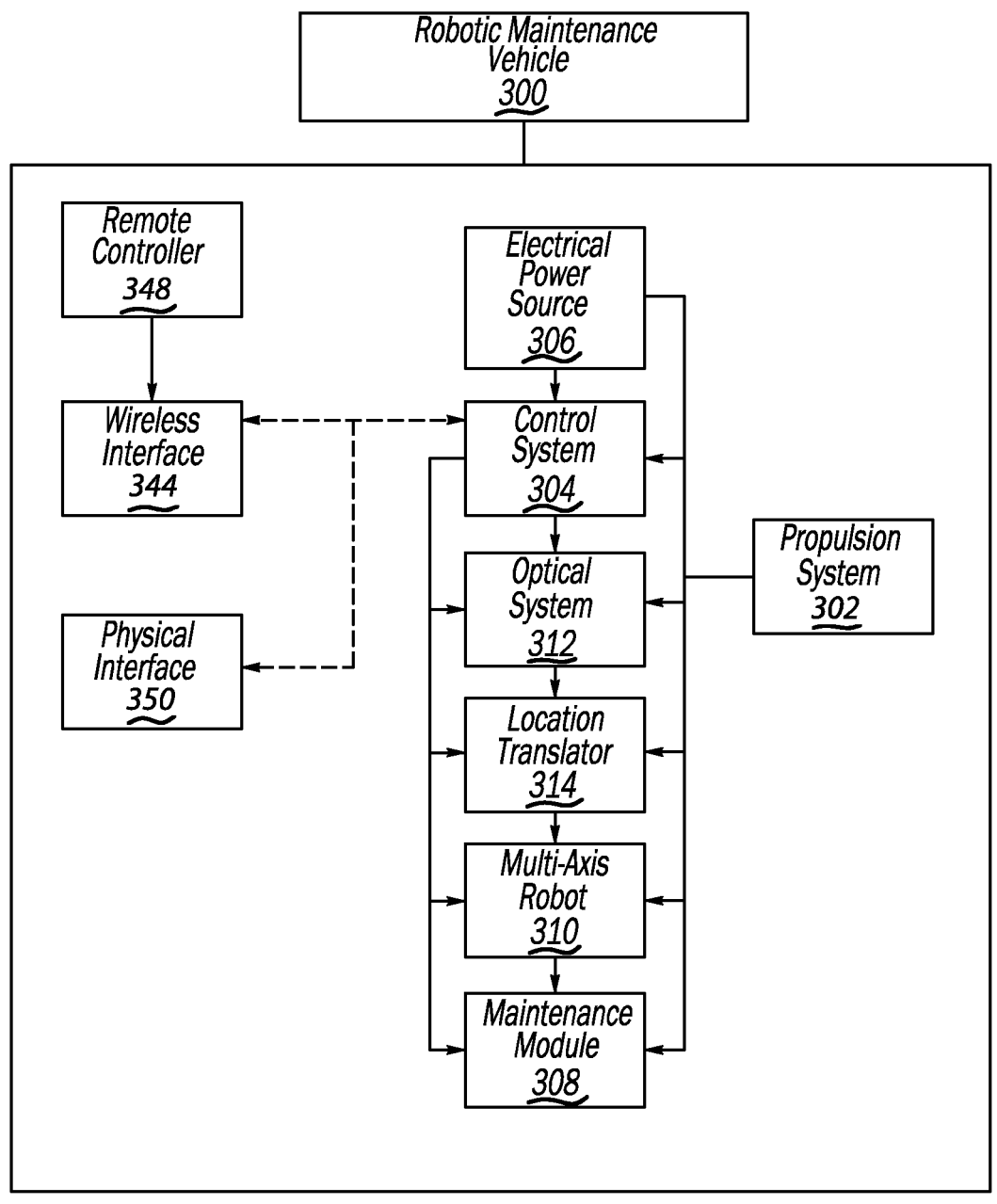
Figures 21, 22:
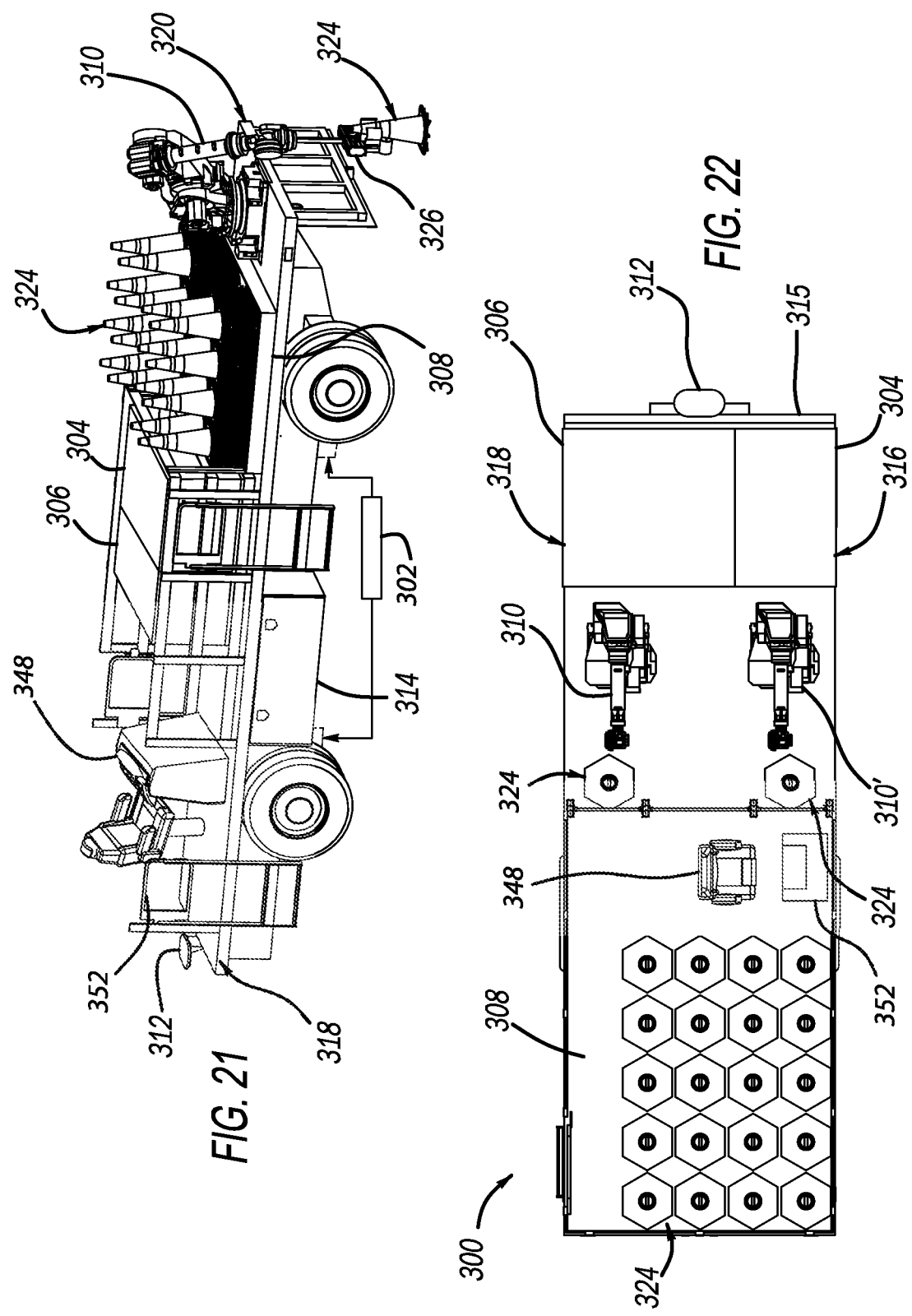
Figures 23, 24:
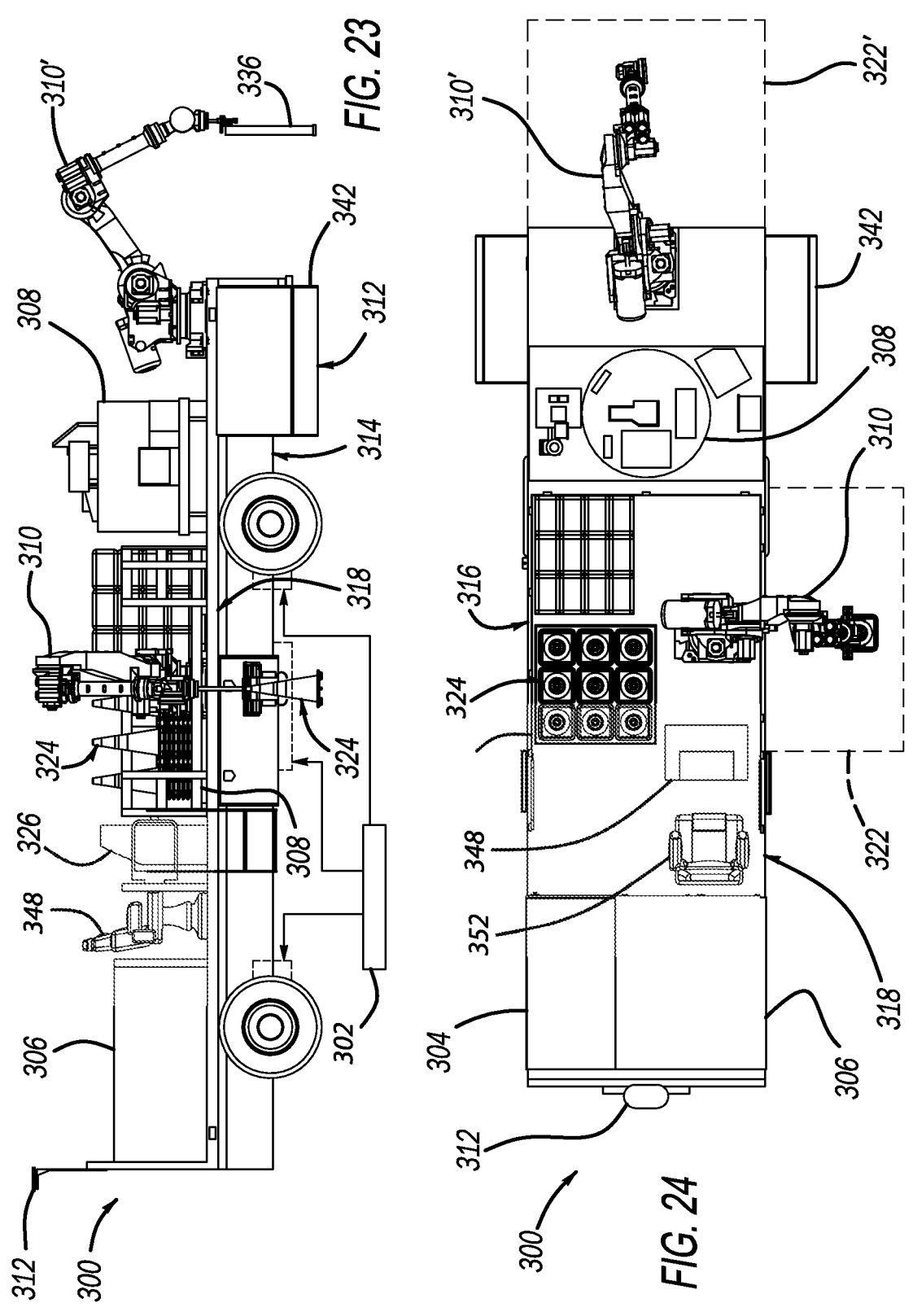
Figure 25:
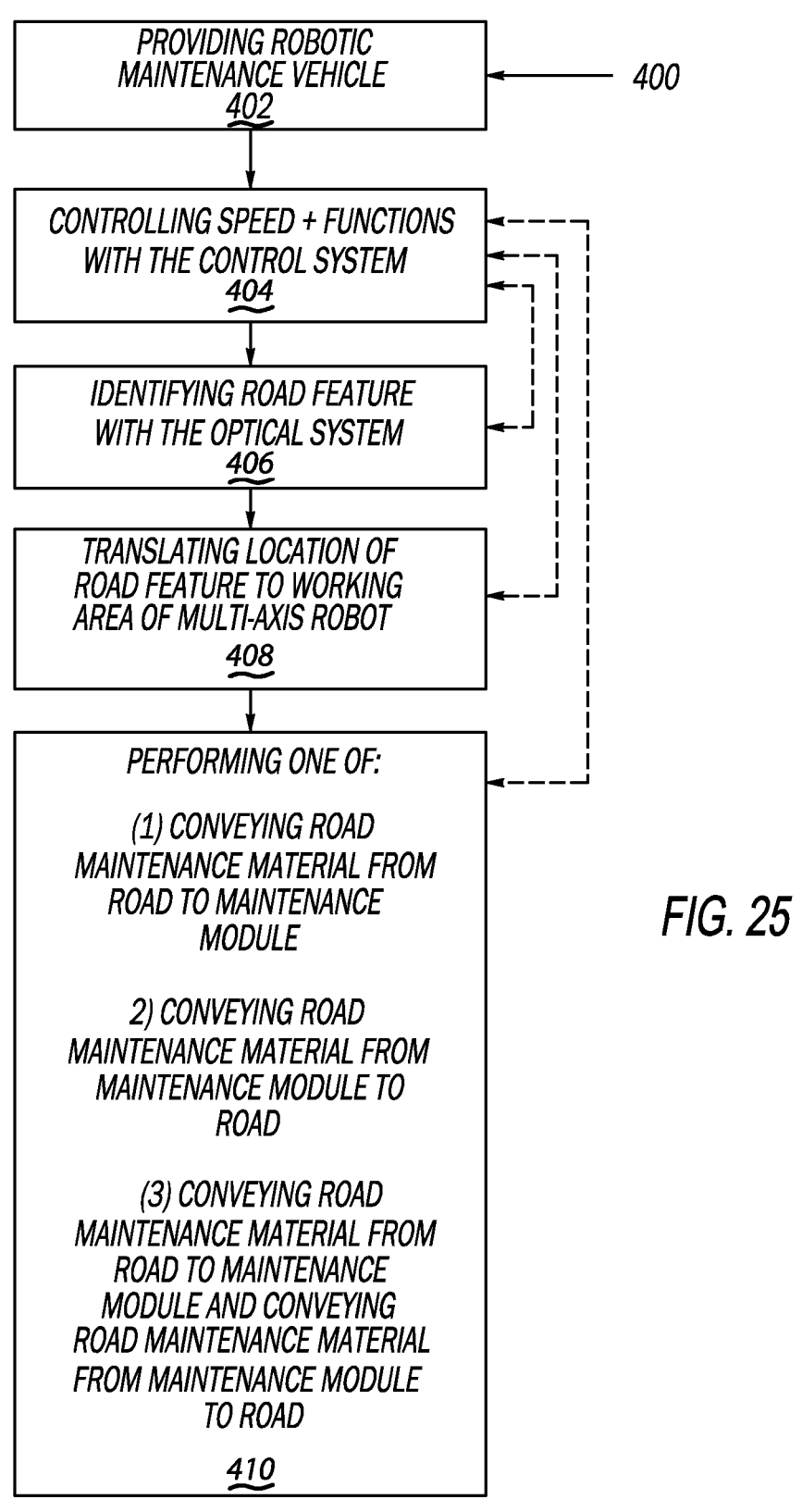
Figures 26, 27:
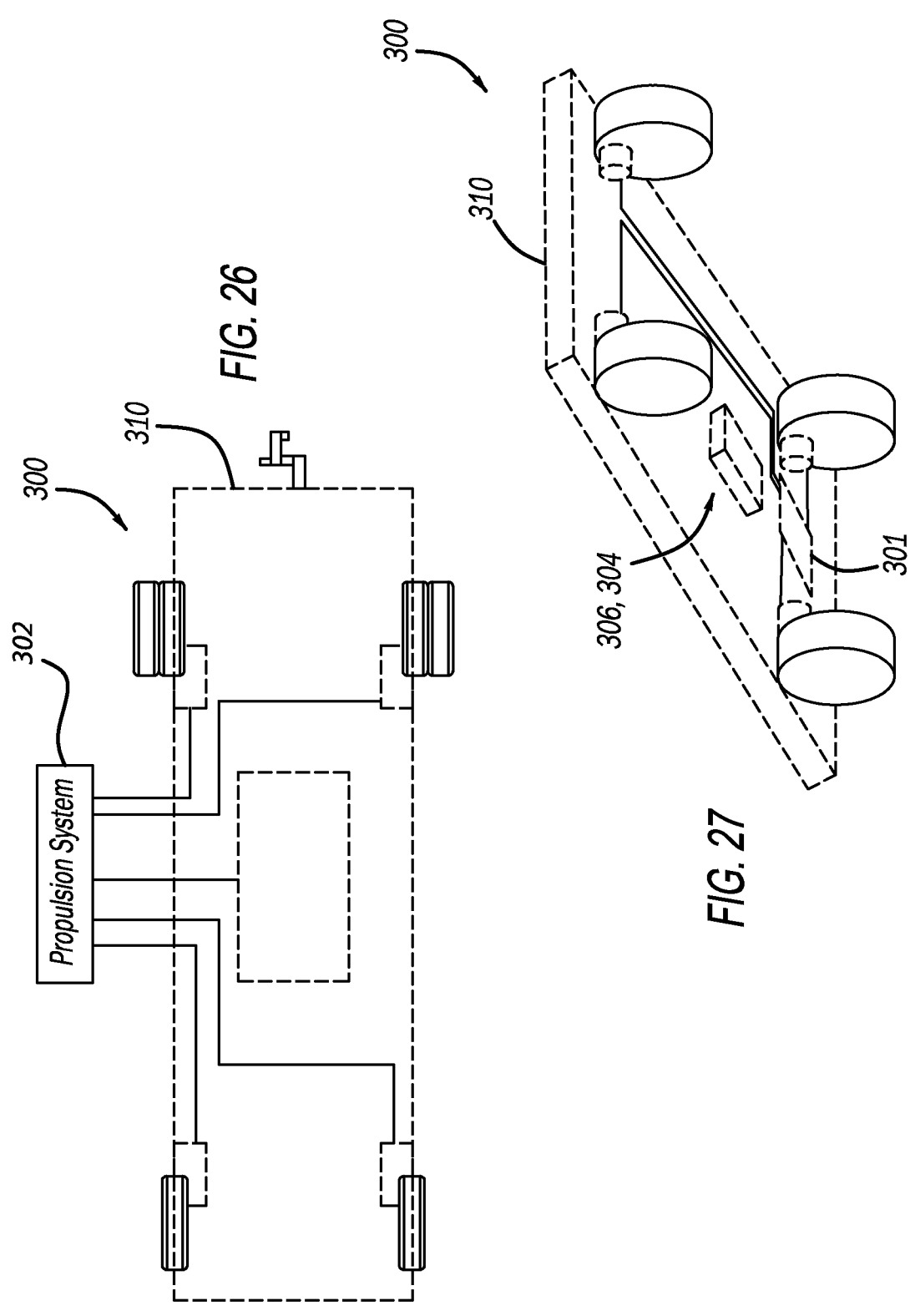

FIG. 11 is a side elevational view of the third embodiment of the RMV, shown in FIG. 10;

FIG. 12 is a top plan view of the third embodiment of the RMV, shown in FIGS. 10-11;

FIG. 13 is a front perspective view of a fourth embodiment of the RMV, depicted with a plurality of multi-axis robots, a cone picking module, and a sealant module, according to another embodiment of the present disclosure;

FIG. 14 is a left side elevational view of the fourth embodiment of the RMV, as shown in FIG. 13;

FIG. 15 is a top plan view of the fourth embodiment of the RMV, as shown in FIGS. 13-14;

FIG. 16 is a top perspective view of a sealant distal arm tool, according to another embodiment of the present disclosure;

FIG. 17 is a right side elevational view of the sealant distal arm tool, as shown in FIG. 16;

FIG. 18 is a front elevational view of the sealant distal arm tool, as shown in FIGS. 16-17;

FIG. 19 is a flowchart of a method for using the RMV, according to one embodiment of the present disclosure;

FIG. 20 is a schematic illustration of components of a Robotic Maintenance Vehicle (RMV) that is capable of self propulsion and controlled by a physical interface, wirelessly, autonomously or a combination thereof;

FIG. 21 is a rear perspective view of another embodiment of the RMV, depicted with a cone picking module, according to one embodiment of the present disclosure;

FIG. 22 is a top plan view of another embodiment of the RMV, depicted with a plurality of multi-axis robots and a plurality of cone picking modules;

FIG. 23 is a left side elevational view of another embodiment of the RMV;

FIG. 24 is a top plan view of another embodiment of the RMV;

FIG. 25 is a flowchart of a method for using the RMV, according to another embodiment of the present disclosure;

FIG. 26 is a bottom view of the RMV, depicted with a propulsion system; and

FIG. 27 is a bottom perspective view of the RMV, depicted with a propulsion system.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9,1-8,1-3,1-2,2-10, 2-8,2-3,3-10,3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology is drawn to a robotic maintenance vehicle (RMV) that includes a vehicle having a propulsion system and a control system, an electrical power source, a multi-axis robot, an optical system, and a location translator. The RMV may further include a maintenance module. The propulsion system may be configured to propel the vehicle. The control system may be configured to control the vehicle, the multi-axis robot, the optical system, the location translator, and the maintenance module. The maintenance module may be configured to hold a road maintenance material. Non-limiting examples of the road maintenance material may include traffic cones, road tar, road sealant, and paint. The multi-axis robot and/or controller may be powered by the electrical power source. The multi-axis robot may be configured to convey the road maintenance material from either the maintenance module to the road, the road to the maintenance module, or both. The multi-axis robot may be configured to be selectively coupled to a distal arm tool. Non-limiting examples, of the distal arm tool may include a sealant dispenser, a cone picker, a saw, a grinder, a chisel, and a scanner. The optical system may be configured to identify a road feature. Non-limiting examples of the road feature may include a traffic cone, a crack, a pothole, a painted signal, and a reflective signal. The location translator may be disposed on an underside of the vehicle and may be configured to translate a location of the road feature identified by the optical system to a work area of the multi-axis robot.

The RMV can further include the following aspects. The vehicle platform may include a chassis and a plurality of wheels. Examples of the vehicle platform may include a trailer, a truck including a propulsion system configured to propel the RMV, and a truck having a trailer coupled to the truck. The propulsion system may include an internal combustion engine, an electric motor, and combinations thereof. The vehicle may further include an operator cab for an operator to control the vehicle. The control system may include a programmable controller, a computer, or a combination thereof. The computer may be an industrial computer. Advantageously, the industrial computer is more durable than generic computers. In a specific example, the electrical power source may include an electric generator. In an alternative specific example, the electrical power source may include using the electrical system of the vehicle. The multi-axis robot may include different brands, sizes, or models of robots or combinations thereof. For instance, the multi-axis may be a six-axis robot. A non-limiting example of the multi-axis robot may be a FANUC R2000/210F. The optical system may include a digital camera, a laser, or a combination thereof. As a non-limiting example, the optical system may include a dual rear backup camera and site cameras with an in-cab monitor. The location translator may include a linear encoder. The work area of the multi-axis robot may be located adjacent to a front edge of the RMV, a right side of the RMV, a left side of the RMV, and/or a rear end of the RMV. The work area of the multi-axis robot may be a three-dimensional volume of a predetermined space surrounding the multi-axis robot. The RMV may also include a plurality of work areas.

In certain embodiments, the computer of the control system includes a processor and a memory. The memory may be in communication with the processor. The memory may include a tangible, non-transitory computer readable memory with processor-executable instructions stored thereon. The processor-executable instructions may be utilized by the control system to carry out the desired functions of the optical system, the location translator, the multi-axis robot, the maintenance module, the electrical power source, the vehicle, and combinations thereof.

In certain embodiments, the road maintenance material may include a plurality of traffic cones. The multi-axis robot may be configured to convey the traffic cones from either the maintenance module to the road, the road to the maintenance module, or both. The multi-axis robot may include a clamping distal arm tool configured to releasably clasp one of the traffic cones. In a specific example, the clamping distal arm tool may include a clamp. The clamp may be configured to clasp one of the traffic cones. In a more specific example, the clamp may have a pair of clamping members actuated along a substantially horizontal axis. In an even more specific example, the clamping distal arm tool may include a vertical clamp and a horizontal clamp. The vertical clamp may be configured to releasably clasp a traffic cone disposed substantially vertical on a surface within the work area of the multi-axis robot. The horizontal clamp may be configured to releasably clasp a traffic cone disposed substantially horizontal on a surface within the work area of the multi-axis robot. For example, a traffic cone may be disposed in a substantially horizontal position where the traffic cone has been knocked over. Other gripping methods may include, but are not limited to, other mechanical devices, a vacuum, a magnet, or other means of holding the road maintenance material within the scope of the present disclosure.

In certain embodiments, the RMV may include another multi-axis robot powered by the electrical power source. The another multi-axis robot may be configured to convey the road maintenance material from either the maintenance module to the road, the road to the maintenance module, or both. The optical system may be configured to identify another road feature. The location translator may be configured to translate a location of the another road feature identified by the optical system to a working area of the another multi-axis robot. In a specific example, the another multi-axis robot may be configured to convey the traffic cones from either the maintenance module to the road, the road to the maintenance module, or both.

In certain embodiments, the road maintenance material may include a sealant and the multi-axis robot may be configured to convey the sealant from the maintenance module to the road. The road feature identified by the optical system may include a crack in a surface of the road. In one example, the sealant module may include a combination of vision equipment and laser equipment. As a non-limiting example, the optical system may include a SICK RANGER3 3D camera. The optical system may further include an optical mapping module configured to map the crack. The optical mapping module may be configured to record the crack and analyze measurements of the crack based on the recording. The recording may be obtained through photographs, video, lasers, or a combination of thereof. Non-limiting examples of the measurements may include a width of the crack, a length of a crack, a depth of the crack, and a volume open space within the crack. The location translator may be configured to relay the location, the orientation, and the measurements of the crack from the optical mapping module to the multi-axis robot. The multi-axis robot may be configured to convey the sealant from the maintenance module to the crack mapped by the optical mapping module. In a specific example, the optical mapping module may include a shroud configured to substantially enclose the crack in the surface of the road and militate against ambient light entering an area defined within the shroud. The optical mapping module may further include a member having a laser, a digital camera, or both. In a non-limiting example, each of the processes, the controls, and the communication of the multi-axis robot, the optical system, the location translator, the maintenance module, and combination thereof are facilitated by the control system.

It should be appreciated that the laser equipment in combination with the vision equipment may be used to create a composite image and representation of distances from the camera. The composite image and the representations of distances from the camera may be processed by a computer program, AI, or combinations thereof to detect cracks and or objects to avoid on a ground surface. The composite image and representations of distances may be displayed on a graphical user interface (GUI). The GUI may display the processed information from the computer program or the AI. The computer program, AI, or combinations thereof may assign values based on the width of the segment, allowing the crack sealer or sealant distal arm tool to dispense a corresponding volume of sealant. The volume of sealant may be changed by altering the rate of material flow or varying the speed of the RMV 100. In certain examples, the computer program may ignore previously sealed regions and the AI may find additional cracks that the computer program may not detect. Both the computer program and the AI may contain logic to connect nearby segments. The logic may preferably have a decreased connection distance variable to reduce aberrations in the composite image, which may conserve sealant or promote efficiency. In particular examples, using the computer program in tandem with the AI may optimize the operation of the sealant distal arm tool.

In certain embodiments, the control system may be configured to selectively instruct the multi-axis robot which individual cracks to seal based on the measurements from the optical mapping module. As a non-limiting example, the control system may be configured to instruct the multi-axis robot to fill cracks greater than ¾" wide and greater than ¾" deep. With continued reference to the non-limiting example, the control system may be configured to instruct the multi-axis robot to not fill cracks greater than 1" wide and 1" deep. It should be appreciated that a skilled artisan may select other suitable units of measurements or ways of selectively filling cracks, within the scope of the present disclosure.

The multi-axis robot may include a sealant distal arm tool fluidly coupled to the road maintenance material. The sealant distal arm tool may be configured to dispense the sealant.

In a specific example, the sealant distal arm tool may have a spring actuated dampener to account for variations in the road surface. The sealant distal arm tool may include a hollow cylinder extending for a predetermined length to support a modular material fluid hose and a nozzle arrangement. Advantageously, the predetermined length of the hollow cylinder supports the hose in circumstances where the multi-axis robot may not be capable of extending to a desired area.

In certain embodiments, the RMV may further include an airstream module configured to provide an airstream to blow debris from the road and from cracks on a surface of the road. As a non-limiting example, the airstream module may be an oscillating air knife fixedly disposed on the vehicle or of which could be selectively movable by the multi-axis robot. Where the airstream module is selectively movable by the multi-axis robot, the airstream module may selectively blow debris from individual cracks.

In certain embodiments, the RMV may include barriers, lights, signage, scanners, and alert systems. The lights, scanners, and alert systems may be configured to notify a human operator where an undesired object enters the work area of the multi-axis robot and/or control the multi-axis robot for automatic speed reduction and/or emergency stopping action. Non-limiting examples of the undesired object may include a person, an animal, and an automobile. In a specific example, the alert system may provide a visual cue, an auditory cue, or both to notify the human operator and initiate controlled motion inhibiters. The barrier and the signage may be configured to notify the human operator of a boundary of the work area of the multi-axis robot. In another specific example, the RMV may further include a kill switch to shut off the power to the multi-axis robot.

In certain embodiments, the RMV may have a maintenance module and a multi-axis robot configured to convey a maintenance material. The RMV may further have another maintenance module and another multi-axis robot configured to convey a different maintenance material. For example, the RMV may be configured to convey a traffic cone to and from the maintenance module. The RMV may also be configured to convey a sealant to and from the another maintenance module. It should be appreciated any number of maintenance modules and multi-axis robots may be utilized on the RMV.

In certain embodiments, a plurality of RMVs may be utilized together. For example, a first RMV could be configured to blow debris out of any cracks in a surface and also set cones on the surface. A second RMV could be configured to find, measure, and fill the cracks in the surface. A third RMV could be configured to pick up the cones from the surface. A skilled artisan may select other maintenance tasks to utilize a plurality of RMVs, within the scope of the present disclosure.

Turning now the accompanying figures provided herewith, particular embodiments of the present technology are shown.

Figure 1:
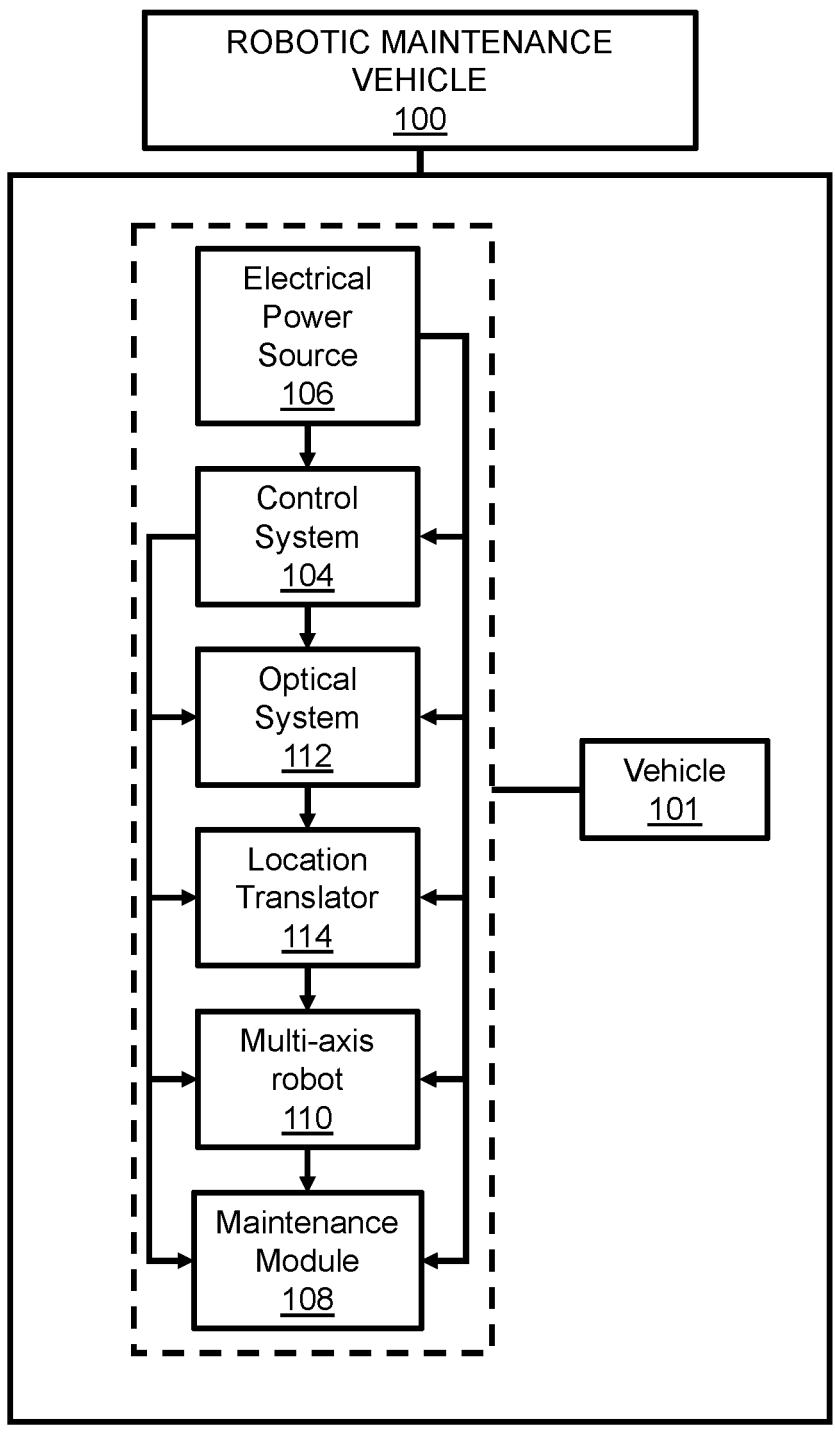
FIG. 1 is a schematic illustration of components of a Robotic Maintenance Vehicle (RMV)
Figures 2, 3:
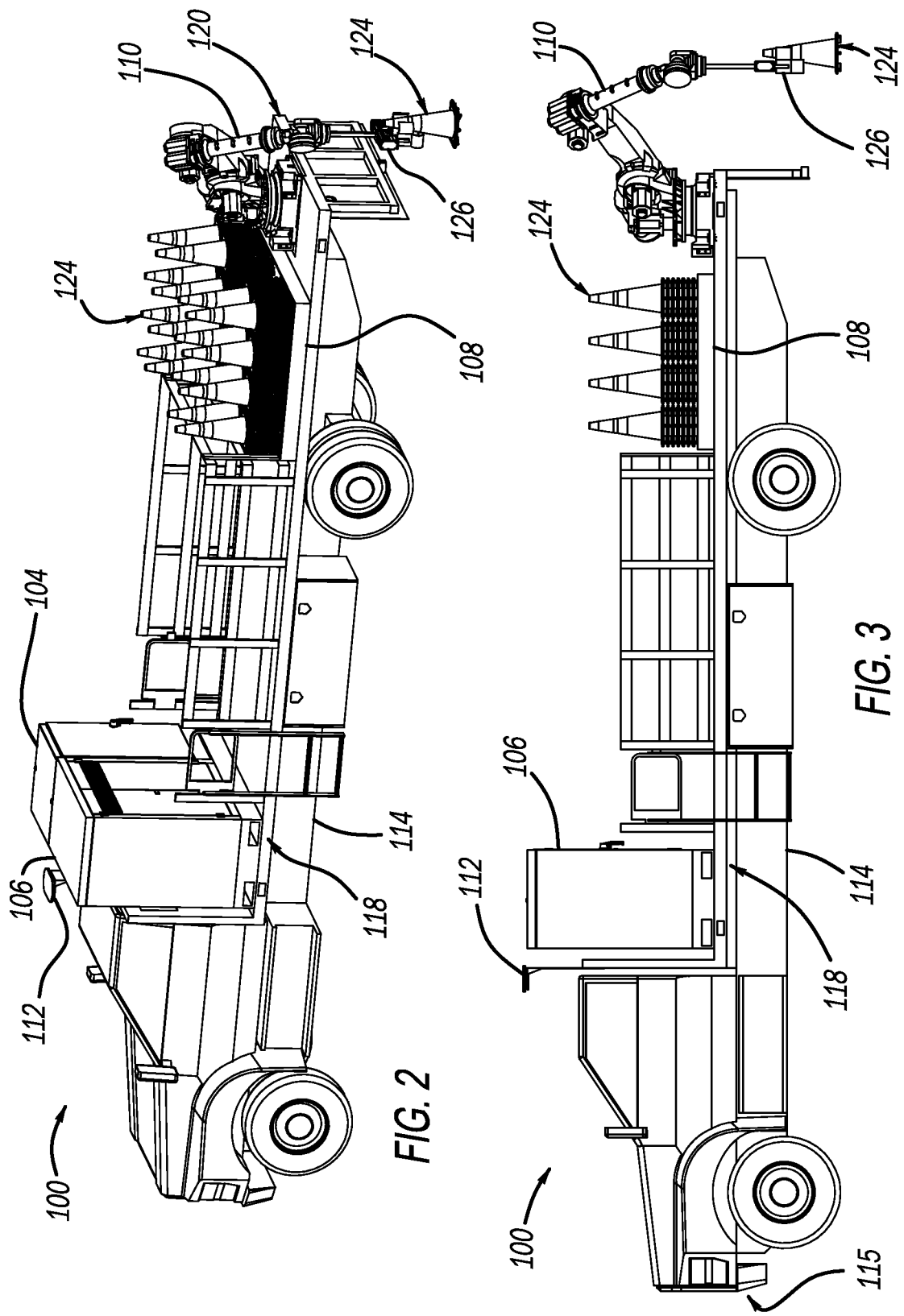
FIG. 2 is a rear perspective view of a first embodiment of the RMV, depicted with a cone picking module, according to one embodiment of the present disclosure.
FIG. 3 is a left side elevational view of the first embodiment of the RMV, as shown in FIG. 2.
Figures 4, 5:
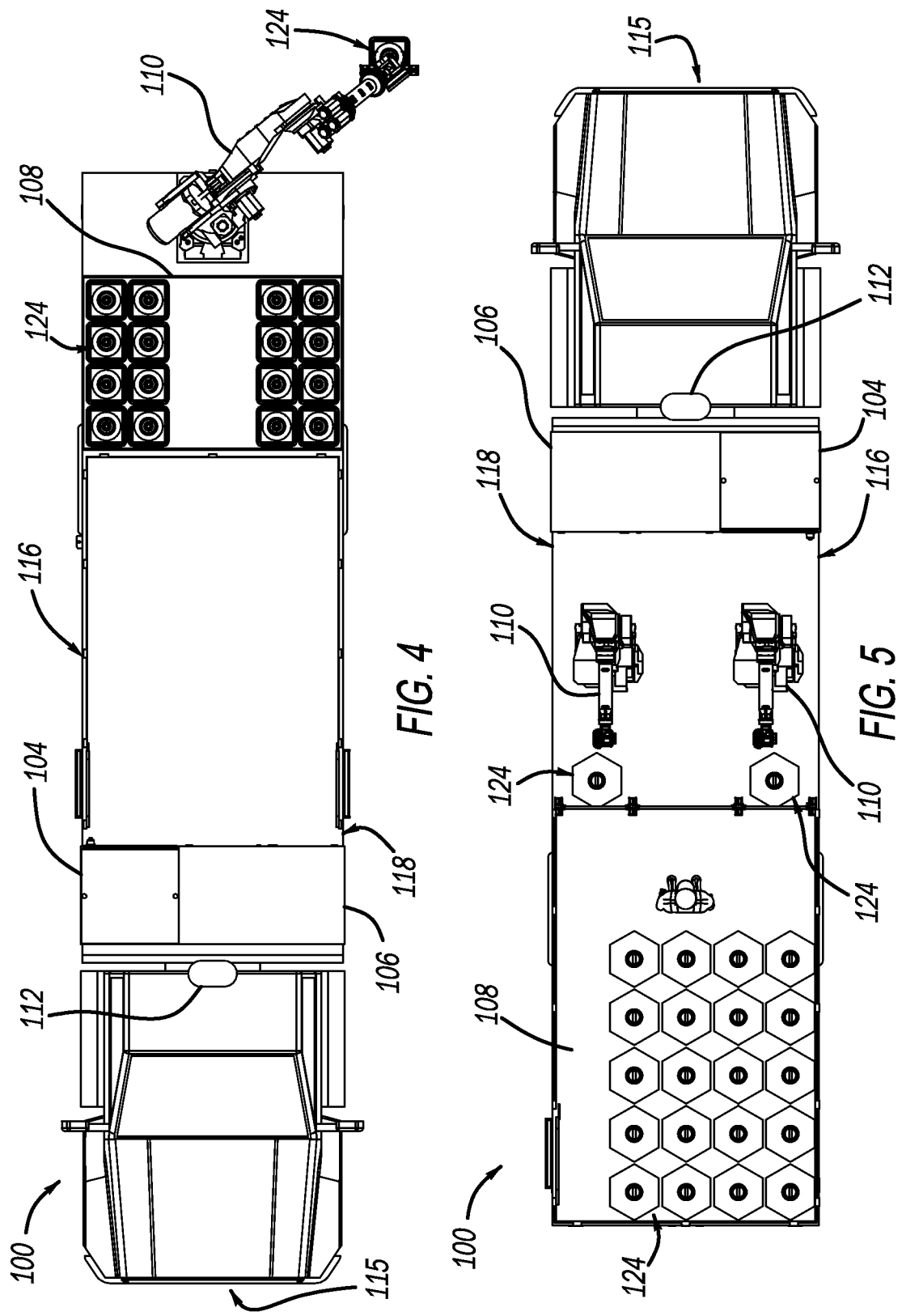
FIG. 4 is a top plan view of the first embodiment of the RMV, as shown in FIGS. 2-3.
FIG. 5 is a top plan view of a second embodiment of the RMV, depicted with a plurality of multi-axis robots and a plurality of cone picking modules.
Figures 6, 7:
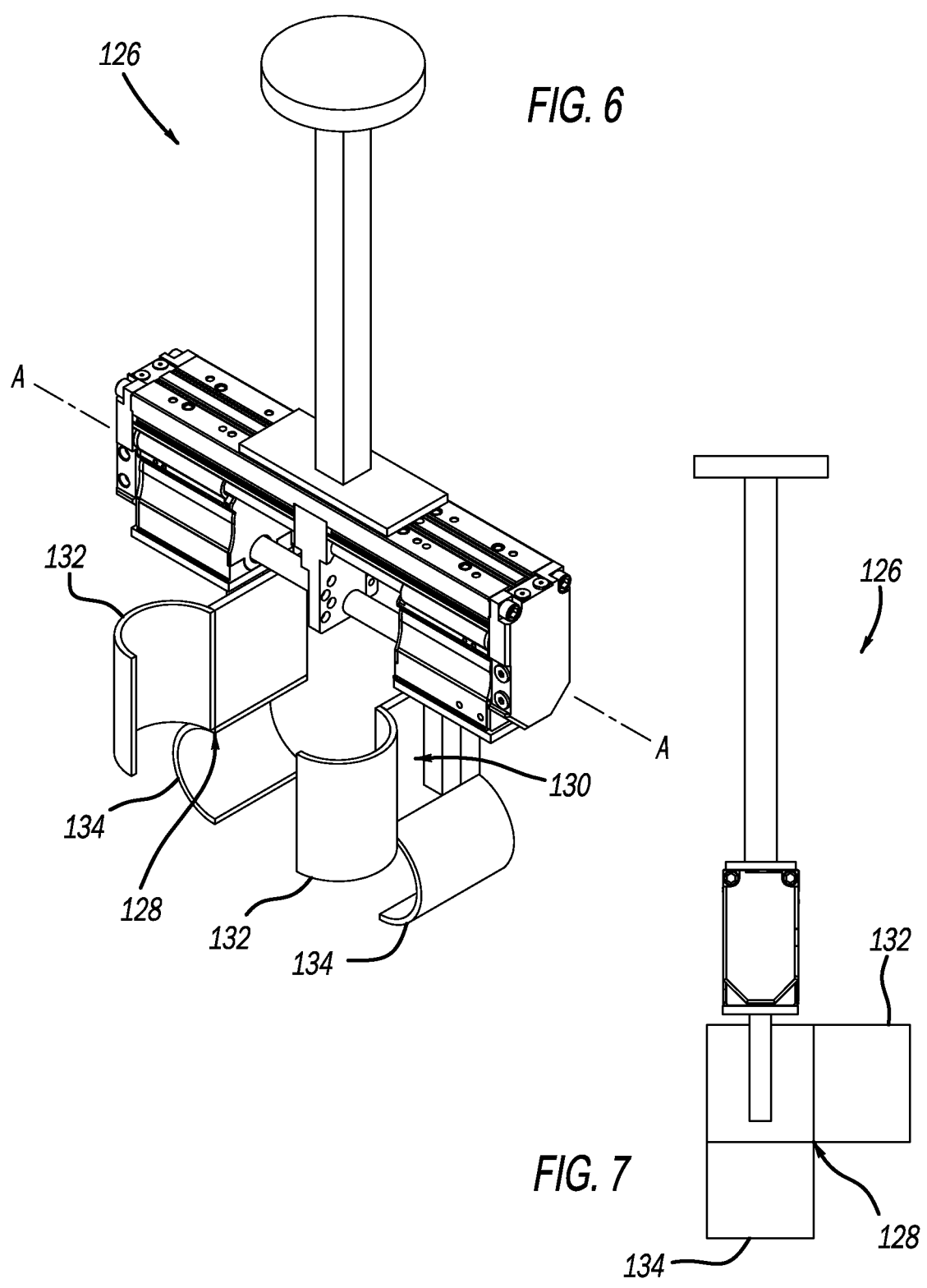
FIG. 6 is a top perspective view of a clamping distal arm tool, according to one embodiment of the present disclosure.
FIG. 7 is a left side elevational view of the clamping distal arm tool, shown in FIG. 6.
Figures 8, 9:
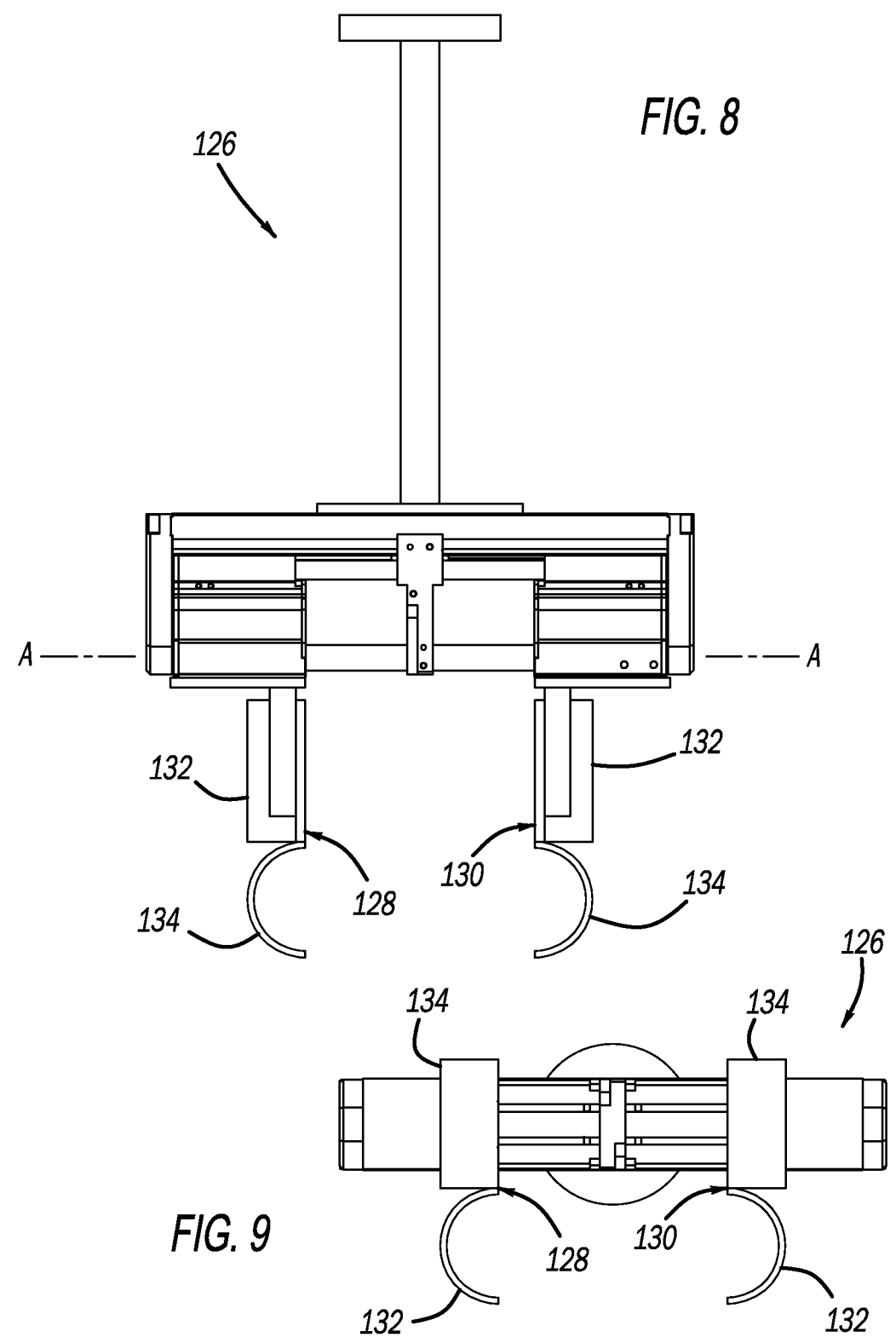
FIG. 8 is a front elevational view of the clamping distal arm tool, shown in FIGS. 6-7.
FIG. 9 is a top plan view of the clamping distal arm tool, shown in FIGS. 6-8.

With reference to FIG. 1, the RMV 100 includes a vehicle 101, a control system 104, an electrical power source 106, a multi-axis robot 110, an optical system 112, and a location translator 114. The RMV 100 may further include a maintenance module 108. The RMV 100 may have a front edge 115, a right side edge 116, a left side edge 118, and a rear edge 120. The multi-axis robot 110 may be disposed along the front edge 115, the right side edge 116, the left side edge 118, and/or the rear edge 120 of the RMV 100. The work area 122 of the multi-axis robot 110 may be disposed adjacent to the front edge 115, the right side edge 116, the left side edge 118, and/or the rear edge 120.

Where the road maintenance material 124 of the RMV 100 includes a plurality of traffic cones, as shown in FIGS. 2-5 and 13-15, the RMV 100 may have the clamping distal arm tool 126 disposed on a terminal end of the multi-axis robot 110. The clamping distal arm tool 126 may include a first clamping member 128 and a second clamping member 130 actuated along a substantially horizontal axis A of the clamping distal arm tool 126. As shown in FIGS. 6-9, each of the first clamping member 128 and the second clamping member 130 may include a vertical clamp 132 and a horizontal clamp 134.

Where the road maintenance material 124 of the RMV 100 includes a sealant, as shown in FIGS. 10-15, the RMV 100 may have the sealant distal arm tool 136 disposed on a terminal end of the multi-axis robot 110. As shown in FIGS. 16-18, the sealant distal arm tool 136 may include a spring actuated dampener 138 and a hose/nozzle support tube 140. With reference to FIGS. 10-15, the maintenance module 108 may further include an airstream module 141 disposed along the front edge 115 of the RMV 100. Advantageously, to enhance accuracy of the optical system 112, a shroud 142 may be disposed adjacent to the work area 122 of the multi-axis robot 110 having a sealant distal arm tool 136. Desirably, the shroud 142 may militate against inaccurate readings from the optical system 112 due to changes in lighting.

In certain embodiments, as shown in FIG. 19, the present technology may be used according to a method 200 of using the RMV 100. The method 200 may include a step 202 of providing an RMV 100 having a propulsion system 102, a control system 104, an electrical power source 106, a maintenance module 108, a multi-axis robot 110, an optical system 112, and a location translator 114. The method 200 may include a step 204 of identifying a road feature with the optical system 112. The method may include another step 206 of translating the location and/or size information of the road feature to the working area 122 of the multi-axis robot 110. Then, the method 200 may include a step 208 of performing one of (1) conveying the road maintenance material 124 from the road to the maintenance module 108, (2) conveying the road maintenance material 124 from the maintenance module 108 to the road, and (3) conveying the road maintenance material 124 from the road to the maintenance module 108 and conveying the road maintenance material 124 from the maintenance module 108 to the road.

Advantageously, an RMV base unit having a multi-axis robot 110, a control system 104, an electrical power source 106, an optical system 112, a location translator 114, and a maintenance module 108 that can accept various modules such as a crack sealer, a pothole filler, a painter, a cone setter, a cone picker, a post setter, a sign setter, a vacuum cleaner, a core sampler, and a reflector inserter may enhance highway maintenance by increasing efficiency and lowering costs.

In a nonlimiting example, the RMV 300 may be provided with an autonomous control system 304, for example, as shown in FIGS. 20-27. As used herein, the word "autonomous" should be interpreted to include semi-autonomous and fully autonomous modes of operation. Like and related structures to that shown in FIGS. 1-19 in a 100-series is depicted in FIGS. 20-27 in a 300-series for purpose of clarity.

With reference to FIG. 20, the RMV 300 has an autonomous control system 304 capable of controlling the RMV 300 and/or individual components of the RMV 300 including a propulsion system 302, electrical power source 306, maintenance modules 308, a multi-axis robot 310, optical system 312, a location translator 314, and combinations thereof. The autonomous control system 304 of the RMV 300 may be configured to take inputs from the optical system 312 and/or the location translator 314 to determine the likelihood of collision, and speed. In response to the inputs, the autonomous control system 304 may control the propulsion system 302, accelerating, decelerating, or braking the RMV 300. The autonomous control system 304 of the RMV 300 may be configured to autonomously maintain position within a lane, maintain pre-set speed limits, maintain a threshold distance from an object, or decelerate to a complete stop. The propulsion system 302 may be an internal combustion engine, an electric motor, other appropriate propulsion systems, and combinations thereof. The RMV 300 may be powered by an electrical power source 306 or a number of suitable power output devices known to those skilled in the art to power the propulsion system 302 or the other components listed hereinabove.

With reference to FIG. 21, 23, 26-27, the propulsion system 302 may be located on the vehicle platform. The vehicle platform may include one of a trailer, a vehicle with a propulsion system 302 configured to propel the RMV 300, a vehicle having a trailer coupled to the vehicle, and a trailer including a propulsion system 302 configured to propel the RMV 300. The propulsion system 302 includes one of an internal combustion engine, an electric motor, and an internal combustion engine and an electric motor. The autonomous control system 304 may be configured to control the vehicle platform of the RMV 300.

With reference to FIG. 24, the maintenance module 308 may be configured to hold a road maintenance material 324. The autonomous control system 304 may control the functions of the multi-axis robot 310 configured to perform a road maintenance operation. The road maintenance operation may include: (1) conveying the road maintenance material 324 from the road to the maintenance module 308, (2) conveying the road maintenance material 324 from the maintenance module 308 to the road, and (3) conveying the road maintenance material 324 from the road to the maintenance module 308 and conveying the road maintenance material 324 from the maintenance module 308 to the road.

With reference to FIG. 21-24, the RMV 300 may be mounted to a vehicle platform which is capable of being controlled directly, remotely, or performing autonomously via the autonomous control system 304. The RMV 300 may have a front edge 315, a right side edge 316, a left side edge 318, and a rear edge 320. The multi-axis robot 310 may be disposed along the front edge 315, the right side edge 316, the left side edge 318, the center of the vehicle platform, or the rear edge 320 of the RMV 300. The work area 322 of the multi-axis robot 310 may be disposed adjacent to the front edge 315, the right side edge 316, the left side edge 318, centrally disposed on the RMV 300, or the rear edge 320. As illustrated in FIGS. 21-24 the RMV 300 may have more flexibility in the disposition of the work areas 322, the multi-axis robots 310, or the electrical power source 306 because the propulsion system 302 allows the areas formerly obstructed by the vehicle 101 to be utilized, increasing design flexibility. In a further example, the electrical power source 306 may be fully or partially disposed within the vehicle platform of the RMV 300.

In a particular example, the RMV 300 may include an electrical power source, for example, an electric generator or battery. The autonomous control system 304 may include a programmable logic controller, a computer, and combinations thereof. The optical system 312 may include a digital camera. The location translator 314 may include a linear encoder. The programmable logic controller, and/or computer may contain a computer program, AI, or combinations thereof which may use inputs from the optical system 312, including the laser equipment, to create a composite image and representation of distances from the camera. The composite image and representations of distances may be displayed on a graphical user interface (GUI). The GUI may display the processed information from the computer program, the AI, and combinations thereof.

In a nonlimiting example, the RMV 300 may utilize sealant as the road maintenance material 324. The multi-axis robot 310 may be configured to convey the sealant from the maintenance module 308 to the road. The optical system 312 may identify a road feature including cracks in a surface of the road. The optical system 312 may further include an optical mapping module configured to map the crack. The optical mapping module may be used to generate a visual representation which may be processed by a computer program, which may include an AI. The autonomous control system 304 may control the functions of the multi-axis robot 310 which conveys the sealant from the maintenance module to the crack mapped by the optical mapping module. The optical mapping module may be configured to calculate an operation speed of the multi-axis robot 310 and a pump rate of the road maintenance material 324. The autonomous control system 304 may control a rate of dispensing of the road maintenance material 324 and an amount of the road maintenance material 324 dispensed based on a size of the crack.

In a further example, the autonomous control system 304 may use the computer program, AI, or combinations thereof to assign values based on the width of the crack. The autonomous control system 304 can allow the crack sealer or sealant distal arm tool 336 to dispense a corresponding volume of sealant based on the value based on the width of the crack received from the computer program, AI, or combinations thereof. The volume of sealant may be altered by varying the rate of material flow or the speed of the RMV 300. In certain examples, the computer program may ignore previously sealed regions and the AI may find additional cracks that the computer program may not detect. Both the computer program and the AI may contain logic to connect nearby segments. The logic may preferably have a decreased connection distance variable to reduce aberrations in the composite image, which may conserve sealant or promote efficiency. In particular examples, using the computer program in tandem with the AI may optimize the operation of the sealant distal arm tool 336.

With reference to FIGS. 23-24, the optical mapping module may further include a shroud 342 configured to substantially enclose the crack in the surface of the road. The optical mapping module may further include a laser, a digital camera, and combinations thereof. The optical mapping module may generate a visual representation. The visual representation may be used by the autonomous control system 304 to control the propulsion system 302 of the RMV 300 along with other functions as described hereinabove. In a particular example, the autonomous control system 304 may control the multi-axis robot 310 including a distal arm tool 336 which is fluidly coupled to the road maintenance material 324 and configured to dispense sealant. In a more particular example, the distal arm tool 336 may have a spring actuated dampener and the autonomous control system 304 may allow the distal arm tool to follow a contour of the road as the distal arm tool moves across a surface of the road. In a most particular example, the RMV 300 may include an airstream module 341. The autonomous control system 304 may control the airstream module 341, which may be configured to provide an airstream to blow debris from the road or a crack in a surface of the road. In further examples, the airstream module 341 may include an oscillating air knife and or fixed nozzles coupled to the robotic maintenance vehicle 300 and/or the multi-axis robot 310.

With reference to FIGS. 22 and 24, the RMV 300 may further include another multi-axis robot 310' powered by the electrical power source 306 and controlled by the autonomous control system 304. The another multi-axis robot 310' may be configured to carry out one of the following road maintenance operations: (1) convey the road maintenance material 324 from the road to the maintenance module 308, (2) convey the road maintenance material 324 from the maintenance module 308 to the road, and (3) convey the road maintenance material 324 from the road to the maintenance module 308 and convey the road maintenance material 324 from the maintenance module 308 to the road. The optical system 312 may be configured to identify another road feature and the location translator 314 may be configured to translate a location of the another road feature identified by the optical system 312 to a working area 322' of the another multi-axis robot 310'.

With reference to FIGS. 21-24, the RMV 300 may further include a plurality of traffic cones as the road maintenance material. The autonomous control system 304 may control the multi-axis robot 310 which is configured to convey one of the traffic cones from the road to the maintenance module and convey one of the traffic cones from the maintenance module to the road. As depicted in FIGS. 6-9, the multi-axis robot 310 may include a clamping distal arm tool 326 with a vertical clamp 332 configured to releasably grasp a traffic cone disposed substantially vertical on a surface. In a more particular example, the multi-axis robot 310 may further include a horizontal clamp 334 configured to releasably clasp a traffic cone disposed substantially horizontal on a surface. In a most particular example, the another multi-axis robot 310' is configured to convey one of traffic cones 324 from the road to the maintenance module 308 and convey one of the traffic cones 324 from the maintenance module 308 to the road.

With reference to FIG. 23-24, the RMV 300 may include the multi-axis robot 310 with road maintenance material 324, which includes a plurality of traffic cones, and another multi-axis robot 310' with another maintenance module configured to hold another road maintenance material, configured to simultaneously carry out two separate functions via the autonomous control system 304. The autonomous control system 304 may use inputs from the optical system 312 to identify another road feature and inputs from the location translator to translate a location of the another road feature identified by the optical system to a working area 322' of the another multi-axis robot 310'. The multi-axis robot 310 may be configured convey one of the traffic cones from the road to the maintenance module and convey one of the traffic cones from the maintenance module to the road. In a nonlimiting example, the another multi-axis robot 310' may be powered by the electrical power source 306, and the another road maintenance material 324 may include a sealant. The another multi-axis robot 310' may be configured to convey the sealant from the another maintenance module 308' to the road. In a further example, the autonomous control system 304 may simultaneously or independently operate the multi-axis robot 310 and another multi-axis robot 310', allowing the RMV 300 to carry out multiple road maintenance operations.

Certain examples of the RMV 300 may further include a wireless interface 344, which includes a transceiver 346. The wireless interface 344 may be controlled by a remote controller 348 or an autonomous control system 304. The RMV 300 may have a remote controller 348 that is configured to control the propulsion system 302 of the RMV 300, one or more multi-axis robots 310, and combinations thereof. The remote controller 348 may be a remote, smart devices like tablets, smartphones, laptops, or other devices.

In certain examples, the RMV 300 may have a physical interface 350 which may be configured to act in tandem with or in lieu of the autonomous control system 304, allowing autonomous or semi-autonomous operation. This may allow a user or the autonomous control system 304 to adjust the speed, steering, or operation of the RMV 300 during autonomous or semi-autonomous operation. The physical interface 350 may be used with, or in lieu of, the wireless interface 344. Additionally, the wireless interface 344 may be in electrical communication with the physical interface 350, RMV 300, one or more multi-axis robots 310, or combinations thereof.

With reference to FIGS. 21, 23, and 26-27, the propulsion system 302 may be located centrally or on two or more of the wheels to generate propulsion. The propulsion system 302 may contain a steering mechanism which is in electrical communication with the physical interface 350 or wireless interface 344. The autonomous control system 304 may be configured to control the physical interface 350 which may contain a steering mechanism. In certain examples, the user may utilize a combination of the physical interface 350, wireless interface 344, or a remote controller 348 to steer the RMV 300.

In a most particular example, the autonomous control system 304 of the RMV 300 may be in electrical communication with another RMV 300' or a trailer with a propulsion system. This may allow one RMV 300 to move in tandem with another RMV 300' or trailer through a respective propulsion system of another RMV 300' or trailer. Through this, a user, a program, an AI, or combinations thereof may operate multiple RMVs 300, 300' or other trailers with additional multi-axis robots 310 through the physical interface 350, wireless interface 344, or a remote controller 348 on one RMV 300.

Certain examples of the RMV 300 may use the autonomous control system 304 to take inputs from at least one or more of the following: the optical system 312, the location translator 314, the electrical power source 306, and one or more components of the propulsion system 302. The autonomous control system 304 may use the inputs to carry out processor-executable instructions to operate the RMV 300, the motors of the propulsion system 302, and/or one or more multi-axis robots 310. The inputs may also be sent through the wireless interface 344 or the physical interface 350, allowing the user to monitor the autonomous operation of the RMV 300. The user may take control of the RMV 300, overriding the autonomous control system 304, along with the maintenance modules 308 through the physical interface 350, the wireless interface 344, which may be accessed through a remote controller 348, or combinations thereof.

With reference to FIGS. 21-24, the RMV 300 has a first end and a second end which is generally opposite the first end. The optical system 312 may be attached to the first end. In certain embodiments, at least one physical interface 350 may be attached to the first end, second end, or the center of the vehicle platform. Optionally, one or more seats 328 may be disposed adjacent to the physical interface 350. In certain examples, the seat 328 and the physical interface 350 may be disposed within an operator cab. The physical interface 350 may include a combination of a steering mechanism or controls which allow the user to operate the multi-axis robot 310 or steer and propel the RMV 300. The physical interface 350 may be in communication with the RMV 300 or one or more multi-axis robots 310 via a wired connection, a transceiver 346 on the RMV 300, or a combination thereof. The transceiver 346 may be configured to provide either one-way or two-way transmission between the autonomous control system 304 and the physical interface 350, wireless interface 344, remote controller 348, other inputs, and combinations thereof.

In a nonlimiting example, the RMV 300 may be capable of autonomously utilizing the modules mentioned above through the autonomous control system 304 which responds to inputs from an optical system 312, the physical interface 350 and/or wireless interface 344. The optical system 312 may use one or more lasers and one or more cameras which generate optical inputs. The optical inputs may be used to create a composite image and representation of distances from the camera. The composite image and the representations of distances from the camera may be processed by a computer program, AI, and combinations thereof to detect cracks on a ground surface. The composite image and representations of distances may be displayed on a graphical user interface (GUI). The GUI may display the processed information from computer program, the AI, and combinations thereof, allowing the user to control and view the optical inputs of the RMV 300. The GUI may also display the progress and actions of the computer program and/or the AI through a wireless interface 344 or physical interface 350. The user may view the GUI remotely through the wireless interface 344 and control the RMV 300 through the use of a remote controller 348. The computer program, AI, or a combination thereof may assign values based on the width of the segment, allowing the crack sealer or sealant distal arm tool 336 to dispense a corresponding volume of sealant. The volume of sealant may be changed by altering the rate of material flow or varying the speed of the propulsion system 302 of the RMV 300. In certain examples, the computer program may ignore previously sealed regions and the AI may find additional cracks that the computer program may not detect. Both the computer program and the AI may contain logic to connect nearby segments. The logic may preferably have a decreased connection distance variable to reduce aberrations in composite image, reducing sealant usage. Using the computer program in tandem with the AI may allow the autonomous control system 304 of the RMV 300 to operate the sealant distal arm tool 336 more accurately.

In certain examples, the RMV 300 may be controlled remotely via a wireless interface 344 which connects to a transceiver 346 via Bluetooth, Wi-Fi, or other wireless data connections and/or physical interface 350 on board. This may allow a user to control the RMV 300 from a remote controller 348 through an application or graphical user interface (GUI).

With reference to FIG. 25, the present technology may be used according to a method 400 of using the RMV 300. The method includes a step 402 of providing an RMV 300 having a propulsion system 302, an autonomous control system 304, an electrical power source 306, a maintenance module 308, a multi-axis robot 310, an optical system 312, and a location translator 314. The method 400 further includes a step 404 of controlling the speed of the RMV 300 and other operations using the autonomous control system

304, which is in electrical communication with the RMV 300, including autonomous operation.

With continued reference to FIG. 25, a method 400 may also include a step 406 of identifying a road feature with the optical system 312. The method may include another step 408 of translating the location and/or size information of the road feature to the working area 322 of the multi-axis robot 310. Certain examples may accomplish this through the use of inputs from the optical system 312, location translator 314, maintenance module 308, the multi-axis robot 310, the autonomous control system 304, and combinations thereof. In particular examples, the transmissions may be sent to and from one or more of the following: remote controller 348, physical interface 350, or wireless interface 344. The information is then interpreted by a computer program, AI, or a combination thereof. Then, the method 400 may include a step 410 of performing one of (1) conveying the road maintenance material 324 from the road to the maintenance module 308, (2) conveying the road maintenance material 324 from the maintenance module 308 to the road, and (3) conveying the road maintenance material 324 from the road to the maintenance module 308 and conveying the road maintenance material 324 from the maintenance module 308 to the road. While certain representative embodiments and details have been shown for purposes of illustrating the invention, it will be apparent to those skilled in the art that various changes can be made without departing from the scope of the disclosure, which is further described in the following appended claims.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A robotic maintenance vehicle comprising:
a vehicle platform;
an electrical power source;
a multi-axis robot powered by the electrical power source, the multi-axis robot configured to perform a road maintenance operation;
an optical system configured to identify a road feature;
a location translator spaced apart from the multi-axis robot, the location translator including a linear encoder, the location translator configured to translate a location of the road feature identified by the optical system to a working area of the multi-axis robot;
a propulsion system configured to propel the robotic maintenance vehicle; and
an autonomous control system spaced apart from the location translator, the autonomous control system configured to control motion of the multi-axis robot based on the translated location of the road feature.

2. The robotic maintenance vehicle of claim 1, including a maintenance module configured to hold a road maintenance material, and wherein the autonomous control system controls the functions of the multi-axis robot configured to perform a road maintenance operation including (1) semi-autonomously conveying the road maintenance material from a road to the maintenance module, (2) semi-autonomously conveying the road maintenance material from the maintenance module to the road, or (3) semi-autonomously conveying the road maintenance material from the road to the maintenance module and semi-autonomously conveying the road maintenance material from the maintenance module to the road.

3. The robotic maintenance vehicle of claim 2, wherein the road maintenance material includes a sealant;
the multi-axis robot is configured to convey the sealant from the maintenance module to the road; and
the road feature identified by the optical system includes a crack in a surface of the road, the optical system further comprises an optical mapping module configured to map the crack, and a visual representation generator for generating a visual representation of the road feature from the optical mapping module and the multi-axis robot is configured to convey the sealant from the maintenance module to the crack mapped by the optical mapping module.

4. The robotic maintenance vehicle of claim 3, wherein the road feature identified by the optical system includes a crack in a surface of the road, the optical mapping module further comprises a calculator to calculate an operation speed of the multi-axis robot and a pump rate of the road maintenance material, wherein the autonomous control system controls a rate of dispensing of the road maintenance material and an amount of the road maintenance material dispensed based on a size of the crack though a computer program.

5. The robotic maintenance vehicle of claim 4, wherein the optical mapping module includes:
a shroud configured to substantially enclose the crack in the surface of the road; and
a member selected from a group consisting of a laser, a digital camera, and combinations thereof to generate a visual representation.

6. The robotic maintenance vehicle of claim 5, wherein the autonomous control system controls the multi-axis robot including a distal arm tool fluidly coupled to the road maintenance material and configured to dispense the sealant.

7. The robotic maintenance vehicle of claim 6, wherein the distal arm tool has a spring actuated dampener and the autonomous control system allows the distal arm tool to follow a contour of the road as the distal arm tool moves across a surface of the road.

8. The robotic maintenance vehicle of claim 7, further comprising an airstream module controlled by the autonomous control system wherein the airstream module is configured to provide an airstream to blow debris from one of the road and a crack in a surface of the road.

9. The robotic maintenance vehicle of claim 8, wherein the airstream module includes an oscillating air knife coupled to one of the robotic maintenance vehicle and the multi-axis robot.

10. The robotic maintenance vehicle of claim 2, further comprising:
another multi-axis robot powered by the electrical power source and controlled by the autonomous control system, the another multi-axis robot configured to (1) convey the road maintenance material from the road to the maintenance module, (2) convey the road maintenance material from the maintenance module to the road, or (3) convey the road maintenance material from the road to the maintenance module and convey the road maintenance material from the maintenance module to the road;

wherein the optical system is configured to identify another road feature; and wherein the location translator is configured to translate a location of the another road feature identified by the optical system to a working area of the another multi-axis robot.

11. The robotic maintenance vehicle of claim 2, wherein:

the road maintenance material includes a plurality of traffic cones; and the multi-axis robot is configured to convey one of the traffic cones from the road to the maintenance module and convey one of the traffic cones from the maintenance module to the road.

12. The robotic maintenance vehicle of claim 11, wherein the multi-axis robot includes a distal arm tool having a vertical clamp configured to releasably grasp a traffic cone disposed substantially vertical on a surface and a horizontal clamp configured to releasably clasp a traffic cone disposed substantially horizontal on a surface.

13. The robotic maintenance vehicle of claim 12, wherein:

the another multi-axis robot is configured to convey one of traffic cones from the road to the maintenance module and convey one of the traffic cones from the maintenance module to the road.

14. The robotic maintenance vehicle of claim 2, wherein:

the road maintenance material includes a plurality of traffic cones;

the multi-axis robot is configured to convey one of the traffic cones from the road to the maintenance module and convey one of the traffic cones from the maintenance module to the road; and the robotic maintenance vehicle further comprises:

another maintenance module configured to hold another road maintenance material, the another road maintenance material including a sealant;

another multi-axis robot powered by the electrical power source, the another multi-axis robot configured to convey the sealant from the another maintenance module to the road;

the optical system is configured to identify another road feature; and the location translator is configured to translate a location of the another road feature identified by the optical system to a working area of the another multi-axis robot.

15. The robotic maintenance vehicle of claim 1, wherein the vehicle platform includes one of: (1) a trailer; (2) a vehicle including the propulsion system, the propulsion system includes one of an internal combustion engine, an electric motor, and an internal combustion engine (3) a vehicle having a trailer coupled to the vehicle; and (4) a trailer including the propulsion system, the propulsion system includes one of an internal combustion engine, an electric motor, and an internal combustion engine and an electric motor.

16. The robotic maintenance vehicle of claim 15, wherein the autonomous control system is further configured to control the vehicle platform.

17. The robotic maintenance vehicle of claim 16, including a maintenance module configured to hold a road maintenance material, and wherein the autonomous control system controls the functions of the multi-axis robot configured to perform a road maintenance operation including (1) semi-autonomously conveying the road maintenance material from a road to the maintenance module, (2) semi-autonomously conveying the road maintenance material from the maintenance module to the road, or (3) semi-autonomously conveying the road maintenance material from the road to the maintenance module and semi-autonomously conveying the road maintenance material from the maintenance module to the road.

18. The robotic maintenance vehicle of claim 1, wherein a distal arm tool is coupled to the multi-axis robot.

19. The robotic maintenance vehicle of claim 18, wherein the distal arm tool includes one of a sealant dispenser, a cone picker, a saw, a grinder, a painter sprayer, and a scanner.

20. The robotic maintenance vehicle of claim 1, wherein the location translator is disposed on an underside of the robotic maintenance vehicle.

21. A method of using a robotic maintenance vehicle comprising:

providing a robotic maintenance vehicle including:

a vehicle platform;

an electrical power source, a multi-axis robot powered by the electrical power source, the multi-axis robot configured to perform a road maintenance operation;

an optical system configured to identify a road feature;

a location translator spaced apart from the multi-axis robot, the location translator including a linear encoder, the location translator configured to translate a location of the road feature identified by the optical system to a working area of the multi-axis robot;

a propulsion system configured to propel the robotic maintenance vehicle; and an autonomous control system spaced apart from the location translator, the autonomous control system configured to control motion of the multi-axis robot based on the translated location of the road feature.

* * * * *